US012144440B2

(12) United States Patent
Broadhead et al.

(10) Patent No.: US 12,144,440 B2
(45) Date of Patent: Nov. 19, 2024

(54) MODULAR MERCHANDISING DISPLAY

(71) Applicant: Nova Wildcat Amerock, LLC, Huntersville, NC (US)

(72) Inventors: Laura Thompson Broadhead, Huntersville, NC (US); Jessica Zingelmann Brown, Wilmington, NC (US); Keely Ann Roberts, Cornelius, NC (US)

(73) Assignee: Amerock, LLC, Huntersville, NC (US)

(*) Notice: Subject to any disclaimer, the term of this patent is extended or adjusted under 35 U.S.C. 154(b) by 0 days.

(21) Appl. No.: 16/914,949

(22) Filed: Jun. 29, 2020

(65) Prior Publication Data

US 2020/0405077 A1 Dec. 31, 2020

Related U.S. Application Data

(60) Provisional application No. 62/868,006, filed on Jun. 28, 2019.

(51) Int. Cl.

*A47F 5/08* (2006.01)
*A47F 5/10* (2006.01)
*A47F 7/00* (2006.01)
*G09F 5/00* (2006.01)

(52) U.S. Cl.

CPC .......... *A47F 5/0884* (2013.01); *A47F 5/0846* (2013.01); *A47F 5/108* (2013.01); *A47F 7/0042* (2013.01); *G09F 5/00* (2013.01)

(58) Field of Classification Search

CPC ...... A47F 5/0884; A47F 5/108; A47F 5/0846; A47F 7/0042; G09F 5/00

See application file for complete search history.

(56) References Cited

U.S. PATENT DOCUMENTS 1,800,387 A * 4/1931 Greist .................. A47F 5/0846 248/307
3,045,961 A * 7/1962 Cygan ....................... G09F 7/08 248/222.12
3,695,452 A * 10/1972 Surman .................. A47F 7/024 211/4
4,094,415 A * 6/1978 Larson ................. A47F 5/0823 211/57.1

(Continued)

FOREIGN PATENT DOCUMENTS

DE 10306002 A1 * 9/2004 .......... A47B 96/067
DE 202020101706 U1 * 10/2020 .............. B25H 3/06

(Continued)

*Primary Examiner* — Stanton L Krycinski

(74) *Attorney, Agent, or Firm* — Reed Smith LLP; Matthew P. Frederick; Cheryl L. Gastineau

(57) ABSTRACT

A modular merchandising display system which, for example, allows for the ability to easily mount and remove samples of household hardware products (e.g. cabinet or bath hardware) and visualize the hardware mounted to e.g. kitchen or bath cabinets, by allowing a person to remove the sample hardware and hold it up to e.g. kitchen or bath cabinets. The display system includes at least one slat wall piece, at least one display channel on a first side of the slat wall piece configured for displaying at least one item and for providing interchangeability of the displayed item; and at least one frame piece framing the at least one slat wall piece.

26 Claims, 31 Drawing Sheets

(56) References Cited

U.S. PATENT DOCUMENTS

| | | | | | |
|---|---|---|---|---|---|
| 4,308,961 | A * | 1/1982 | Kunce | A47F 5/0853 211/57.1 |
| 4,572,381 | A * | 2/1986 | Breakey | A47F 5/0846 211/94.01 |
| 4,747,025 | A * | 5/1988 | Barton | A47F 5/0846 211/94.01 |
| 4,805,783 | A * | 2/1989 | Mayer | A47F 5/0846 211/189 |
| 4,805,784 | A * | 2/1989 | Solheim | A47F 5/0846 211/59.1 |
| 5,105,952 | A * | 4/1992 | Krattiger | A47F 5/0846 211/40 |
| 5,142,832 | A * | 9/1992 | Branham, Sr. | A47F 5/0846 211/87.01 |
| 5,607,070 | A * | 3/1997 | Hellyer | A47F 5/108 211/189 |
| 5,775,521 | A * | 7/1998 | Tisbo | A47B 17/033 211/11 |
| 5,819,490 | A * | 10/1998 | Current | A47F 5/0846 52/588.1 |
| 5,857,578 | A * | 1/1999 | Fishman | A47F 5/0846 211/189 |
| 6,068,135 | A * | 5/2000 | Holztrager | A47F 5/0846 211/4 |
| 6,164,467 | A * | 12/2000 | DePottey | A47F 5/0846 211/189 |
| 6,199,705 | B1 * | 3/2001 | Portner | A47F 5/0846 211/26 |
| 6,497,329 | B1 * | 12/2002 | Johnson | A47F 5/0018 206/459.5 |
| 6,681,510 | B1 * | 1/2004 | Salatin | A61G 17/04 40/661 |
| 6,772,890 | B2 * | 8/2004 | Campbell | A47F 5/0846 211/189 |
| 6,945,414 | B1 * | 9/2005 | Stevens | A47F 5/0846 211/183 |
| 7,086,542 | B2 * | 8/2006 | Tomonari | A47B 96/067 211/94.01 |
| 7,198,159 | B2 * | 4/2007 | Fischer | A47F 5/0846 211/189 |
| 7,591,385 | B2 * | 9/2009 | Brooks | A47F 5/0846 211/70.6 |
| 7,954,648 | B2 * | 6/2011 | Takashima | A47F 1/12 211/59.3 |
| 8,033,404 | B2 * | 10/2011 | Keller | A47F 5/0846 211/94.01 |
| 8,146,754 | B2 * | 4/2012 | Apgood, II | A47F 5/0846 211/94.01 |
| 8,177,311 | B2 * | 5/2012 | Apgood, II | A47F 5/0846 312/245 |
| 8,205,395 | B2 * | 6/2012 | Jakiel | E04F 13/18 52/36.5 |
| 9,180,591 | B2 * | 11/2015 | McLean | B25H 3/04 |
| 9,206,827 | B2 * | 12/2015 | Loree | A47B 96/02 |
| 9,596,948 | B1 * | 3/2017 | McGinnis | A47F 5/00 |
| 9,700,157 | B2 * | 7/2017 | Keyvanloo | H01R 25/14 |
| 9,936,807 | B2 * | 4/2018 | Ryan | A47B 81/005 |
| 10,405,676 | B1 * | 9/2019 | Underwood | F16B 45/00 |
| 10,674,840 | B2 * | 6/2020 | Haroush | A47F 5/0869 |
| 11,089,885 | B2 * | 8/2021 | Keller | A47F 5/0846 |
| 2004/0256338 | A1 * | 12/2004 | McGarry | A47F 5/0838 211/94.01 |
| 2006/0091093 | A1 * | 5/2006 | Armari | A47F 5/0846 211/94.01 |
| 2006/0091094 | A1 * | 5/2006 | Schuberth | A47F 5/0846 211/94.01 |
| 2006/0266901 | A1 * | 11/2006 | Tallman | A47F 5/0846 248/220.43 |
| 2007/0256996 | A1 * | 11/2007 | Jackle | A47F 5/0846 211/94.01 |
| 2008/0000861 | A1 * | 1/2008 | Muellerleile | A47B 96/06 211/94.01 |
| 2008/0302744 | A1 * | 12/2008 | Rosenberg | A47F 5/0846 211/94.01 |
| 2009/0313919 | A1 * | 12/2009 | Chuang | G09F 15/0006 52/202 |
| 2010/0175919 | A1 * | 7/2010 | Ellis | F21S 8/033 174/481 |
| 2014/0198490 | A1 * | 7/2014 | Halseth | A47B 96/027 362/147 |
| 2017/0198871 | A1 * | 7/2017 | Keenan | F21V 23/06 |
| 2018/0070746 | A1 * | 3/2018 | Wang | A47F 5/103 |
| 2018/0352954 | A1 * | 12/2018 | Keenan | A47B 57/06 |

FOREIGN PATENT DOCUMENTS

| | | | | |
|---|---|---|---|---|
| EP | 0212996 A2 * | 3/1987 | E04H 1/1272 |
| EP | 0683998 A1 * | 11/1995 | A47F 5/0846 |
| FR | 2450582 A1 * | 10/1980 | A47G 21/14 |
| FR | 2880640 A1 * | 7/2006 | A47B 96/027 |
| WO | WO-2009051798 A2 * | 4/2009 | G09F 3/0295 |

* cited by examiner

MODULAR MERCHANDISING DISPLAY

CROSS REFERENCE TO RELATED APPLICATION

This application claims the benefit of U.S. Provisional Application No. 62/868,006 filed Jun. 28, 2019, the entire content of which is incorporated herein by reference.

BACKGROUND

This application discloses an invention which is related, generally and in various embodiments to merchandise displays. More specifically, embodiments disclosed in this application are related to merchandise displays of household hardware products such as hooks, bath accessories, hinges, pull handles or knobs for kitchen or bathroom cabinets. Typically, household hardware products are sold in stores using displays including pull-out and tilt bins holding products of similar style or size. The display may also include samples of cabinet doors. Household hardware products are also typically sold in static wall and tower displays having the hardware products fixedly mounted thereon.

SUMMARY

According to embodiments of the disclosure, a display system comprises a plurality of interlocking slat wall pieces vertically interlocked together, wherein each slat wall piece comprises at least one display channel on a first side of the slat wall piece; plurality of display pieces each having a base configured to display a display item attached thereto; wherein each display piece is configured to be removeably received in the at least one display channel for providing interchangeability of the display pieces; and at least one frame piece framing the at least one slat wall piece.

According to embodiments of the disclosure, each display piece includes at least one through hole, wherein each at least one through hole is configured for receiving a fastener configured to fasten the display item to the at least one display piece, According to embodiments of the disclosure, the at least one through hole has a counter sink configured for receiving a fastener head of the fastener.

According to embodiments of the disclosure, each base is formed from a transparent material.

According to embodiments of the disclosure, a pair of bases are configured to display one of the display items in one of a horizontal orientation and a vertical orientation.

According to embodiments of the disclosure, the display item is a household hardware product selected from a hook, a bath accessory, a hinge, a knob and a pull handle.

According to embodiments of the disclosure, at least one visualizer clip configured to be removeably received in the at least one display channel, and also configured to clip onto a cabinet door or cabinet door sample when removed from the at least one display channel to hold one of the display pieces on the cabinet door or cabinet door sample.

According to embodiments of the disclosure, the at least one visualizer clip further comprising a pair of visualizer clips configured to clip to a cabinet door or cabinet door sample and hold a display piece there between in one of a horizontal orientation and a vertical orientation.

According to embodiments of the disclosure, the at least one visualizer clip has a leg having spring back flexibility and is configured to be clipped on a cabinet door or cabinet door sample of varying thicknesses.

According to embodiments of the disclosure, the at least one visualizer clip comprises a feature corresponding to a matching feature on the at least one display channel.

According to embodiments of the disclosure, each interlocking slat wall piece further comprises: a groove on a first end thereof; and a locking lip on a second end thereof, wherein the locking lip is configured to be inserted into one of an end cap and the groove on a vertically adjacent one of the plurality slat wall pieces.

According to embodiments of the disclosure, the at least one frame piece further comprises a backing board attached to a rear side of the plurality of slat wall pieces.

According to embodiments of the disclosure, at least one through hole disposed in the backing board configured for at least one of mounting and holding.

According to embodiments of the disclosure, a display system comprises at least one slat wall piece, wherein each slat wall piece comprises at least one display channel on a first side of the slat wall piece; wherein each display channel has an upper groove and a lower groove; a plurality of display pieces each having a base configured to display a display item attached thereto; wherein each display piece is configured to be removeably received in the at least one display channel, wherein a top portion of each display piece is configured to be received first in the upper groove, and wherein the display piece is further configured to be tilted and a lower portion thereof is configured to be received in the lower groove, and wherein the upper groove and the lower groove are configured to cooperate with the display piece to allow the display piece to be tilted and dropped.

According to embodiments of the disclosure, the at least one visualizer clip comprises a first feature configured to be received in the upper groove, wherein the at least one visualizer clip is further configured to be tilted and a second feature thereof is configured to be received in the lower groove.

BRIEF DESCRIPTION OF THE DRAWINGS

FIG. 12F shows a view of a pair of clips of FIG. 12A alone.

DETAILED DESCRIPTION

Figure 1A:
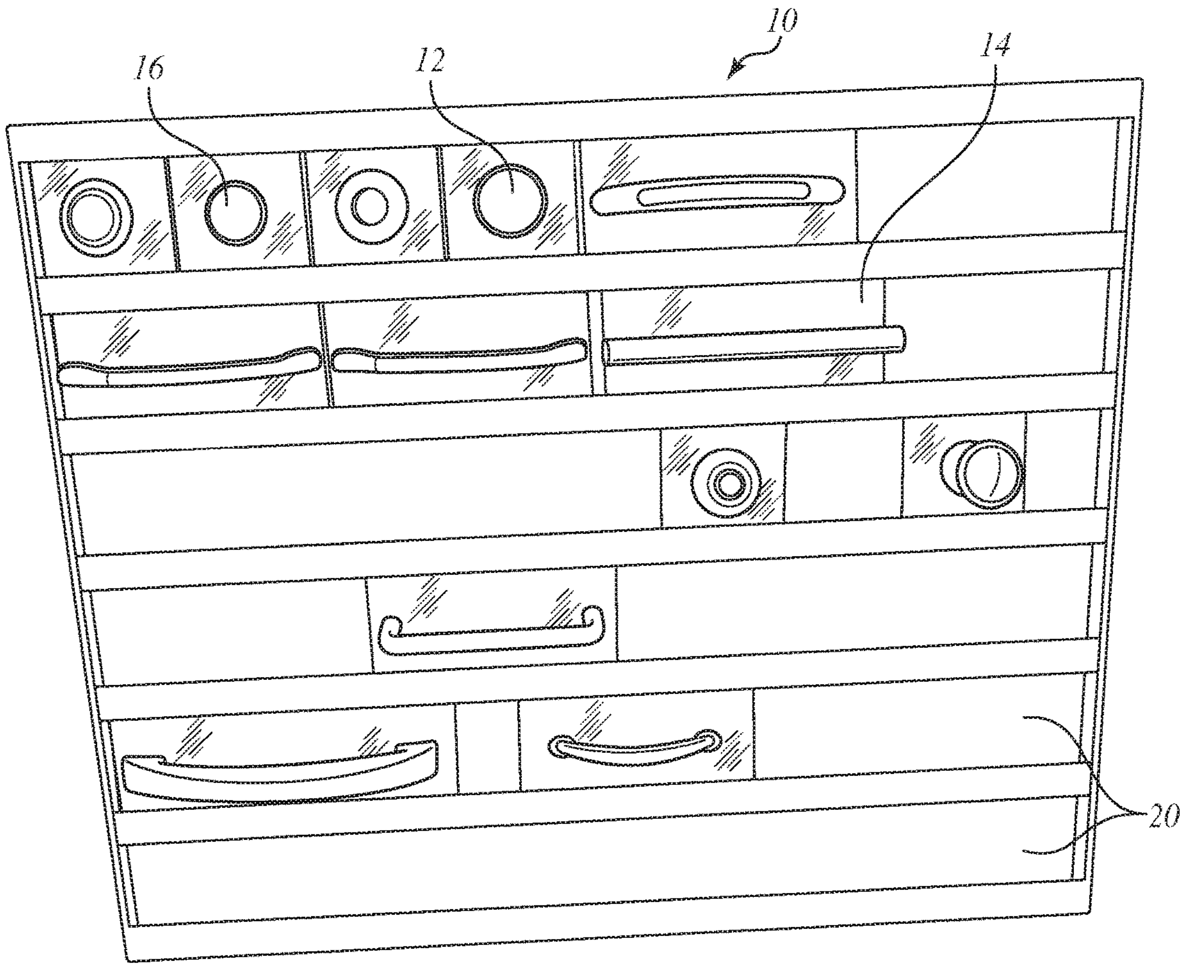
FIG. 1A shows a front view of the modular merchandising display according to embodiments of the invention.
Figure 1B:
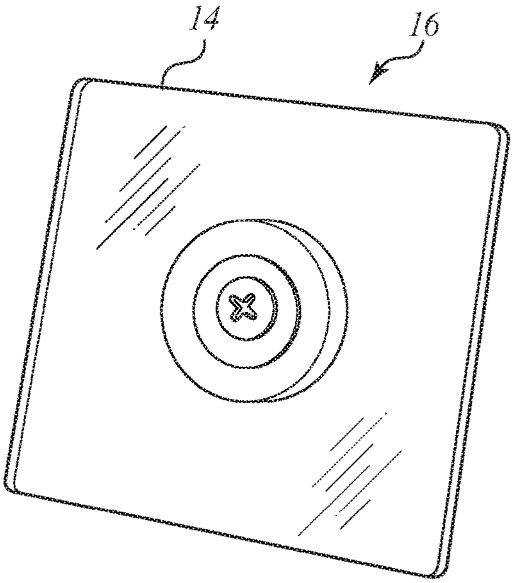
FIG. 1B shows a rear view of a display piece according to embodiments of the invention.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Referring to FIGS. 1A-24, embodiments of a modular merchandising display 10 are shown. Modular merchandising display 10 is, for example, a rack that allows for the ability to easily mount and remove samples of household hardware products 12 (e.g. cabinet or bath hardware) and visualize the hardware mounted to e.g. kitchen or bath cabinets, by allowing a person to remove the sample hardware and hold it up to e.g. kitchen or bath cabinets. Examples of household hardware products 12 which may be displayed in embodiments of the modular merchandising display 10 include: knobs; pulls; handles; decorative hooks; wall plates; functional cabinet hardware such as latches and hinges; and bath accessories such as towel bars/rings, toilet tissue holders, etc.

Specifically, individual products 12 are mounted to product bases 14 composed of transparent material such as an acrylic or plexiglass material forming a display piece 16. Product bases 14 may be any suitable shapes such as rectangular, square or circular and have through holes 14B for mounting products 12 with fasteners such as screws inserted in through holes 14B. In certain embodiments, display pieces 16 are removeably displayed on a modular merchandising display 10 comprised of rows of display channels 20 where by a "tilt and drop" action, the display pieces 16 are installed, but can be easily removed when necessary to view product 12 on a cabinet or within the environment in which the product 12 will be used. In further embodiments, the merchandising display 10 is manufactured in a modular way from a number of interlocking slat wall pieces 22 that allow for complete flexibility in size. In some embodiments, the interlocking slat wall pieces 22 include multiple rows of display channels 20. In some embodiments, multiple interlocking slat wall pieces 22 slide or snap together along with an end cap piece 24, two L-shaped side frame pieces 26, and a top cap piece 28 to produce a finished modular merchandising display 10 of any desired size. The modular merchandising display 10 is capable of mounting to multiple surfaces such as sheet rock, slat wall, freestanding merchandising display, etc. In certain embodiments, the modular merchandising display 10 is formed from an extruded plastic material, such as rigid polyvinyl chloride (RPVC), or another extrudable material such as aluminum. In some embodiments, the display 10 can be configured by stacking multiple interlocking slat wall pieces 22 to control the height of display 10, while the width of display 10 can be configured by the length of the extruded material forming the individual slat wall pieces 22.

Referring to FIGS. 4A-8B, details of an embodiment of the merchandising display 10 are shown. As shown in FIGS. 5A-5C, each interlocking slat wall piece 22 includes a vertical wall portion 30 forming the back wall portion of two horizontal display channels 20 including an upper display channel 20A and a lower display channel 20B. A first upper protrusion 32 extends forwardly from an upper portion of vertical wall portion 30. An intermediate protrusion 34 extends forwardly from an intermediate portion of vertical wall portion 30. Upper protrusion 32 includes a first groove 36 on an upper portion thereof and a second groove 38 on a lower portion thereof. Intermediate protrusion 34 includes a third groove 40 on an upper portion thereof and a fourth groove 42 on a lower portion thereof. In certain embodiments, the first upper protrusion 32 and the intermediate protrusion 34 have the same profile. The upper display channel 20A is formed between the second groove 38 and the third groove 40. Display pieces 16 are removeably displayed in the upper display channel 20A, whereby a "tilt and drop" action, the display pieces 16 are installed between the second groove 38 and the third groove 40. Specifically, the top edge of a display piece 16 is inserted first into the second groove 38, and then the bottom edge is rotated or "tilted" in and then dropped into the third groove 40, whereby the display piece is retained by the grooves, wherein the grooves 38, 40 are configured to cooperate with the display pieces 16 to allow the display pieces 16 to be tilted and dropped. The lower display channel 20B is formed between the fourth groove 42 and the first groove 36 of a vertically adjacent interlocking slat wall piece 22. Display pieces 16 are removeably displayed in the lower display channel 20B, whereby a "tilt and drop" action, the display pieces 16 are installed between the fourth groove 42 and the first groove 36 of a vertically adjacent interlocking slat wall piece 22. Specifically, the top edge of each display piece 16 is inserted first into the fourth groove 42, and the bottom edge is rotated or "tilted" in and then dropped into the first groove 36, whereby the display piece is retained by the grooves.

In certain embodiments, a lower portion of vertical wall portion 30 includes a locking lip 44. In some embodiments, a second upper protrusion 46 extends rearwardly from an upper portion of vertical wall portion 30. Second upper protrusion 46 includes a fifth groove 48 configured to receive a locking lip 44 of a vertically adjacent interlocking slat wall piece 22 so that slat wall pieces 22 can be connected or "stacked." In embodiments, the fifth groove 48 includes an upper horizontal element 21. In embodiments, the locking lip 44 of a vertically adjacent interlocking slat wall piece 22 includes an upper horizontal face 23. The upper horizontal face 23 of the locking lip 44 of the vertically adjacent interlocking slat wall piece may be configured to correspond to the upper horizontal element 21. In embodiments, the fifth groove 48 further includes a lower horizontal element 25. In embodiments, the locking lip of a vertically adjacent interlocking slat wall piece 22 further includes a lower horizontal face 27. In embodiments, the fifth groove may further include a vertical element 29. The fifth groove 48 may be configured to retained the locking lip 44 of a vertically adjacent interlocking slat wall piece 22 in at least two dimensions. The locking lip 44 may be retained by any combination of the upper horizontal element 21, the lower horizontal element 21, the fifth groove 48, and the vertical element 29. In this embodiment, second upper protrusion 46 includes a sixth groove 50 configured to hang on a hanging feature such as a nail or bracket on a wall.

Figure 5C:
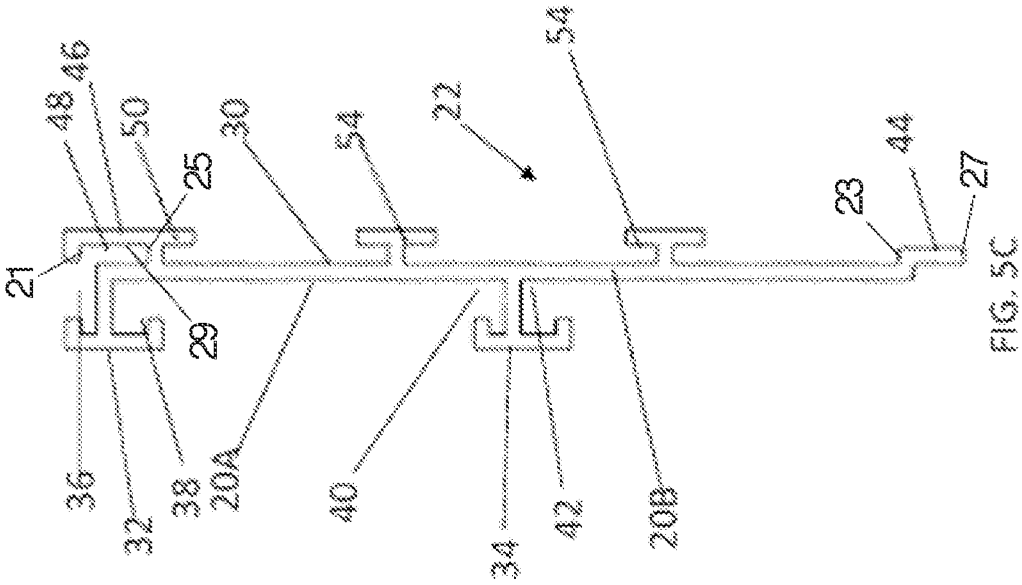
FIG. 5C shows a side view of the interlocking piece of FIG. 5A
Figure 5A:
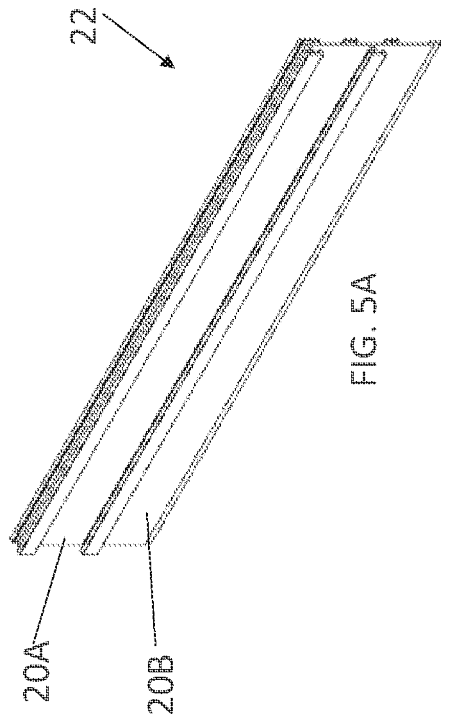
FIG. 5A shows a perspective view of the interlocking piece according to embodiments of the invention.
Figure 5B:
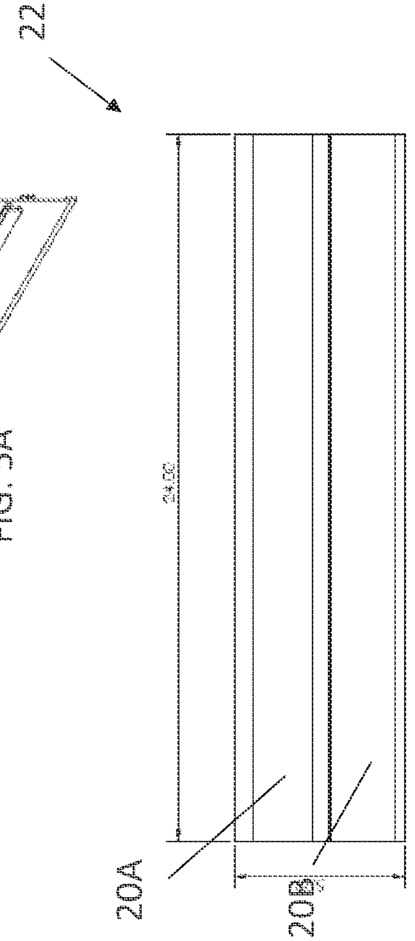
FIG. 5B shows a front view of the interlocking piece of FIG. 5A.

In some embodiments, each interlocking slat wall pieces 22 further includes spaced projections 54 extending rearwardly from the vertical wall portion 30. Projections 54 provide rigidity to vertical wall portion 30. In the illustrated embodiment, each vertical wall portion 30 has two spaced projections 54. In the illustrated embodiment, projections 54 are T-shaped in profile and provide a surface configured to be joined by, for example, adhesive to, for example, L-shaped side frame pieces 26 and frame back 104, discussed below. The L-shaped side frame pieces 26 may also adhere to upper protrusion 46. Three vertically adjacent interlocking slat wall pieces 22 are shown interlocked together in the illustrated embodiments. FIGS. 5A-5C show a single slat wall piece 22.

Figure 6B:
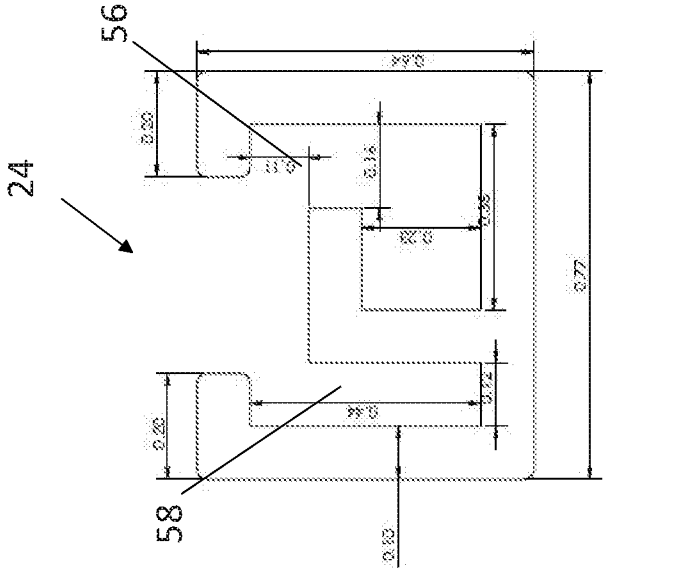
FIG. 6B shows a side view of the end cap piece of FIG. 6A.
Figure 6A:
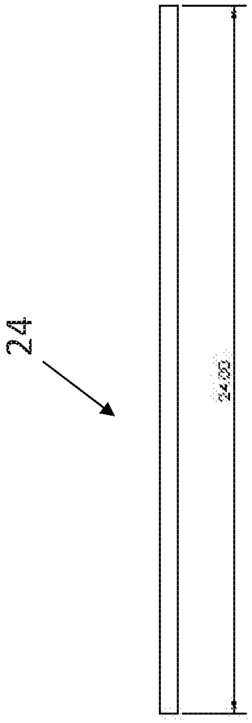
FIG. 6A shows a front view of the end cap piece according to embodiments of the invention.

In other embodiments, the locking lip 44 is configured to interlock with the end cap piece 24, as shown in an embodiment in FIGS. 6A-6B, which is configured to interlock with the lowermost interlocking slat wall piece 22. End cap piece 24 includes a forwardly positioned seventh groove 56 and a rearwardly positioned eighth groove 58. When there is no interlocking slat wall pieces 22 below the lowermost interlocking slat wall piece 22, seventh groove 56 may act like the first groove 36 to form the lower portion of the lower display channel 20B of the lowermost interlocking slat wall piece 22. Eighth groove 58 is configured to receive the locking lip 44 of the lowermost interlocking slat wall piece 22.

Figure 7C:
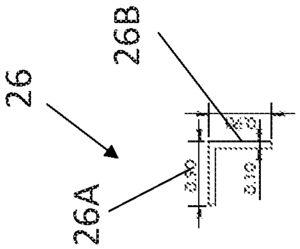
FIG. 7C shows a side view of the L-shaped side frame piece of FIG. 7A
Figure 7A:
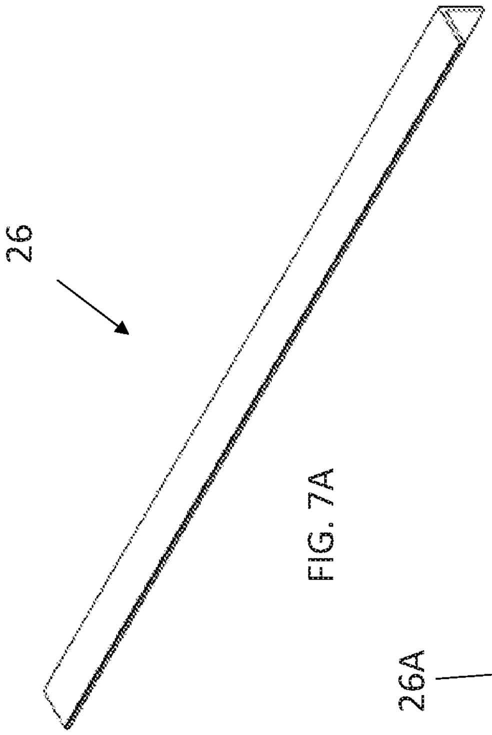
FIG. 7A shows a perspective view of the L-shaped side frame piece according to embodiments of the invention.
Figure 7B:
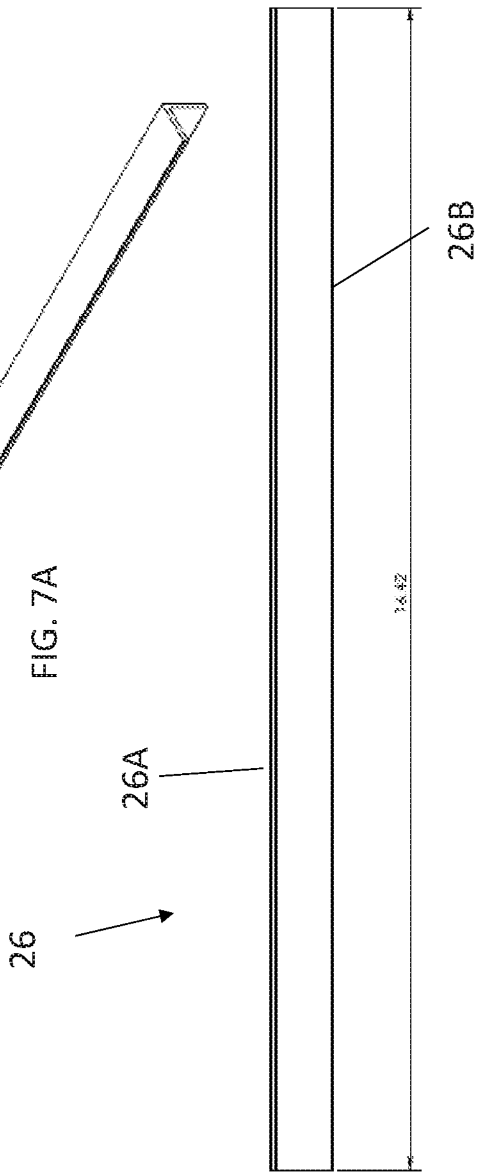
FIG. 7B shows a front view of the L-shaped side frame piece of FIG. 7A.

As shown in the embodiments of FIGS. 7A-7C, each L-shaped side frame piece 26 is configured to wrap around the sides to the rear of the modular merchandising display 10. L-shaped side frame piece 26 includes a side portion 26A and a rear portion 26B.

Figure 3:
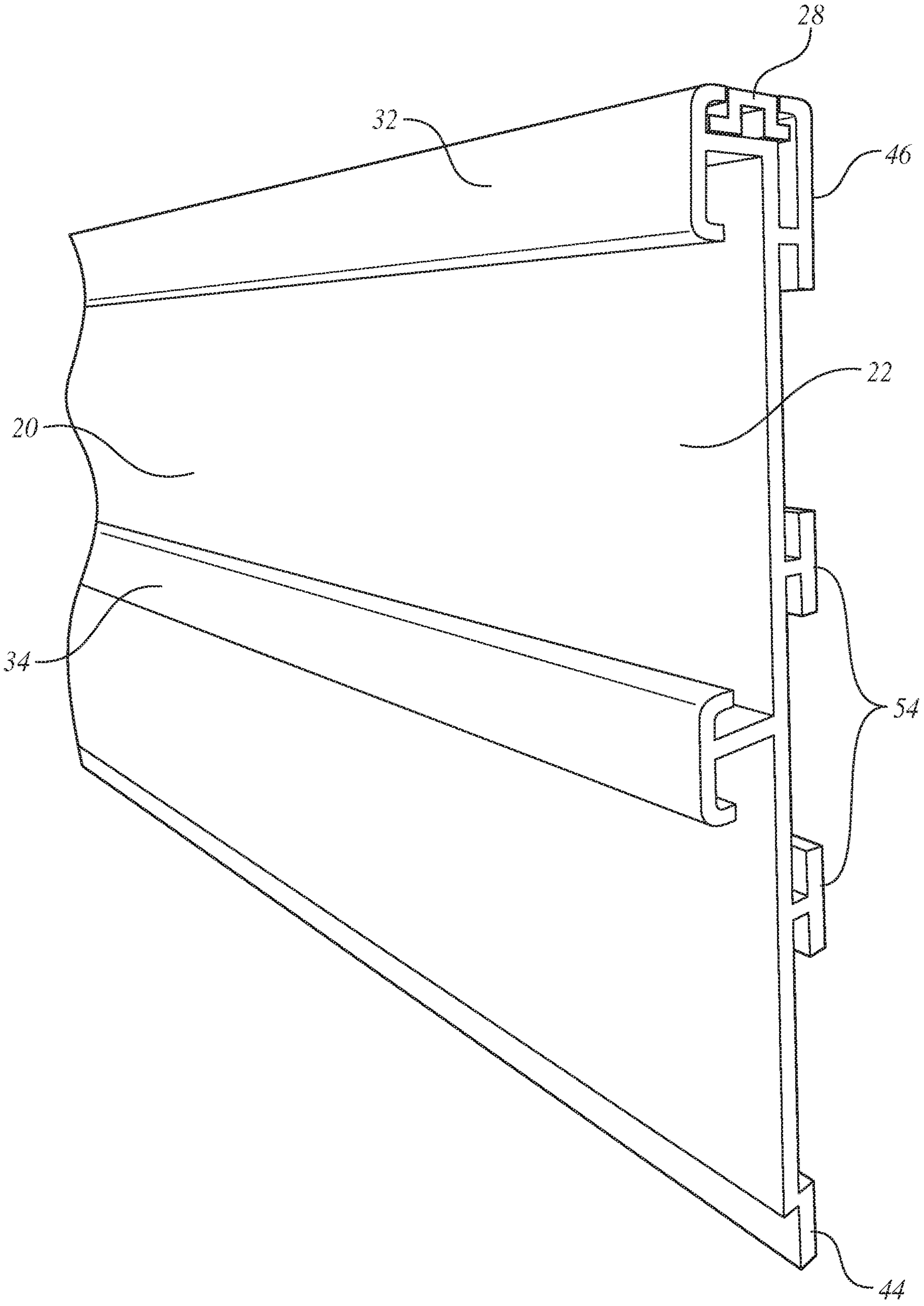
FIG. 3 shows a perspective view of an interlocking piece according to embodiments of the invention.
Figure 4C:
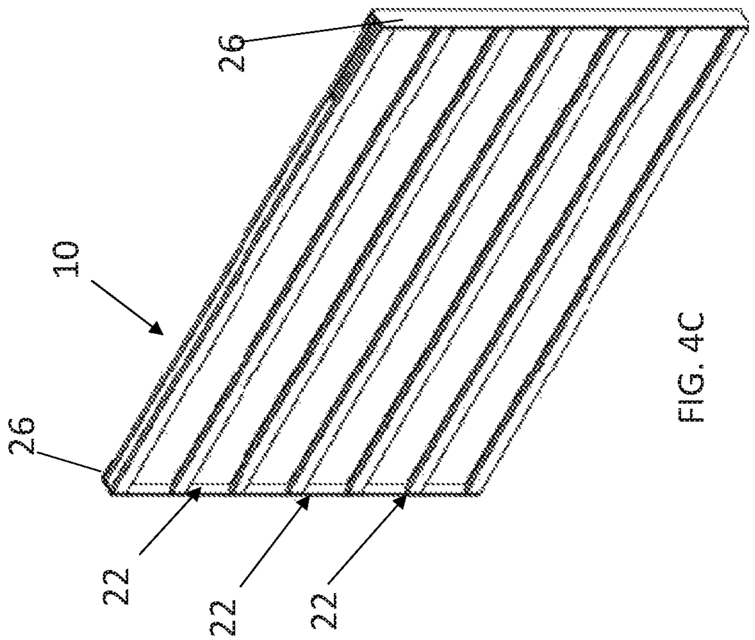
FIG. 4C shows a perspective view of the modular merchandising display of FIG. 4A.
Figure 4B:
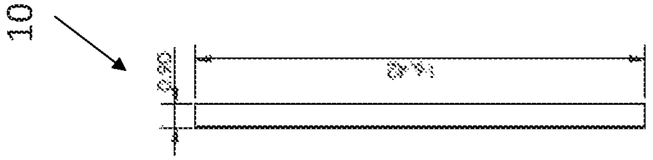
FIG. 4B shows a side view of the modular merchandising display of FIG. 4A.
Figure 4A:
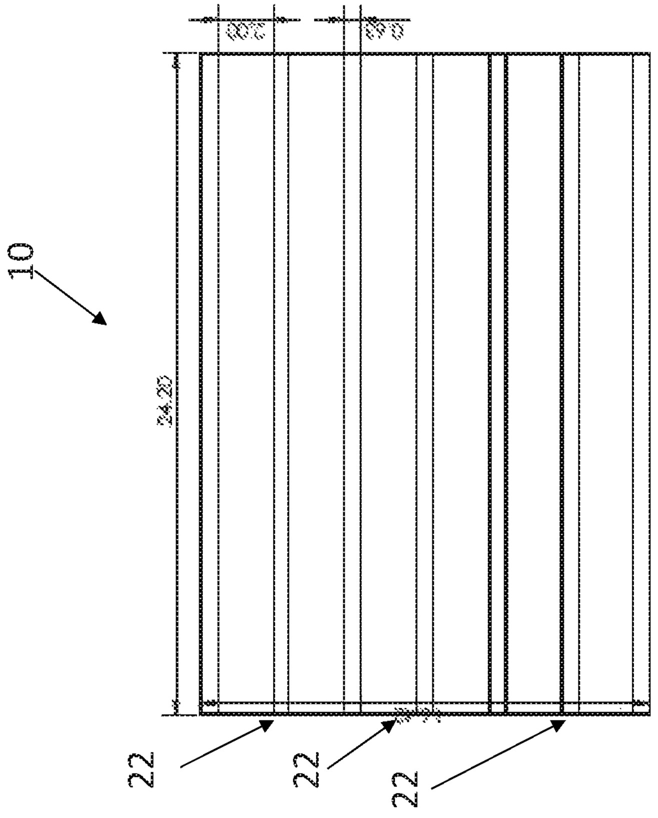
FIG. 4A shows a front view of the modular merchandising display according to embodiments of the invention.
Figure 8A:
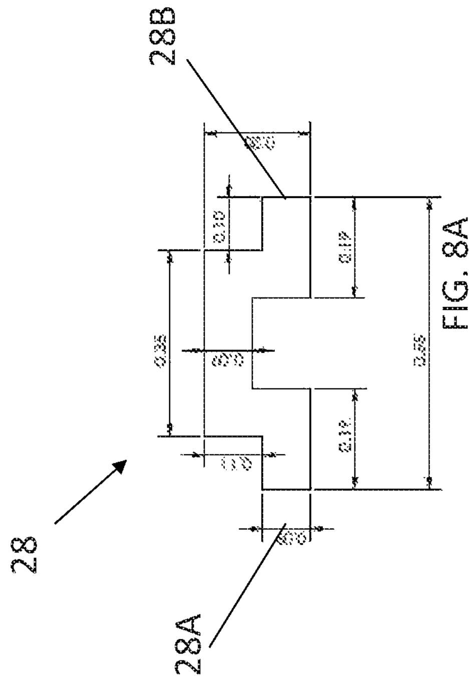
FIG. 8A shows a side view of the top cap piece according to embodiments of the invention.
Figure 8B:
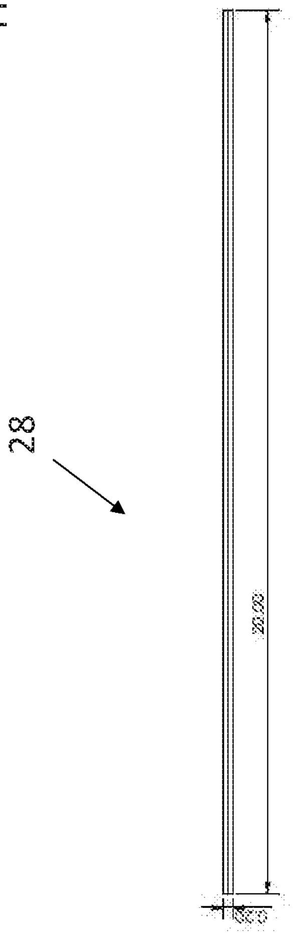
FIG. 8B shows a front view of the top cap piece of FIG. 8A.

As shown in the embodiments of FIGS. 3 and 8A-8B, the top cap piece 28 is configured to be inserted between first groove 36 and fifth groove 48 of the uppermost slat wall piece 22 in an interconnected stack of slat wall pieces 22 to form a finished top edge of a modular merchandising display 10. In this embodiment, top cap piece has a substantially hat-shaped profile having oppositely extending flanges 28A and 28B configured to be inserted into first groove 36 and fifth groove 48, respectively.

Figure 9:
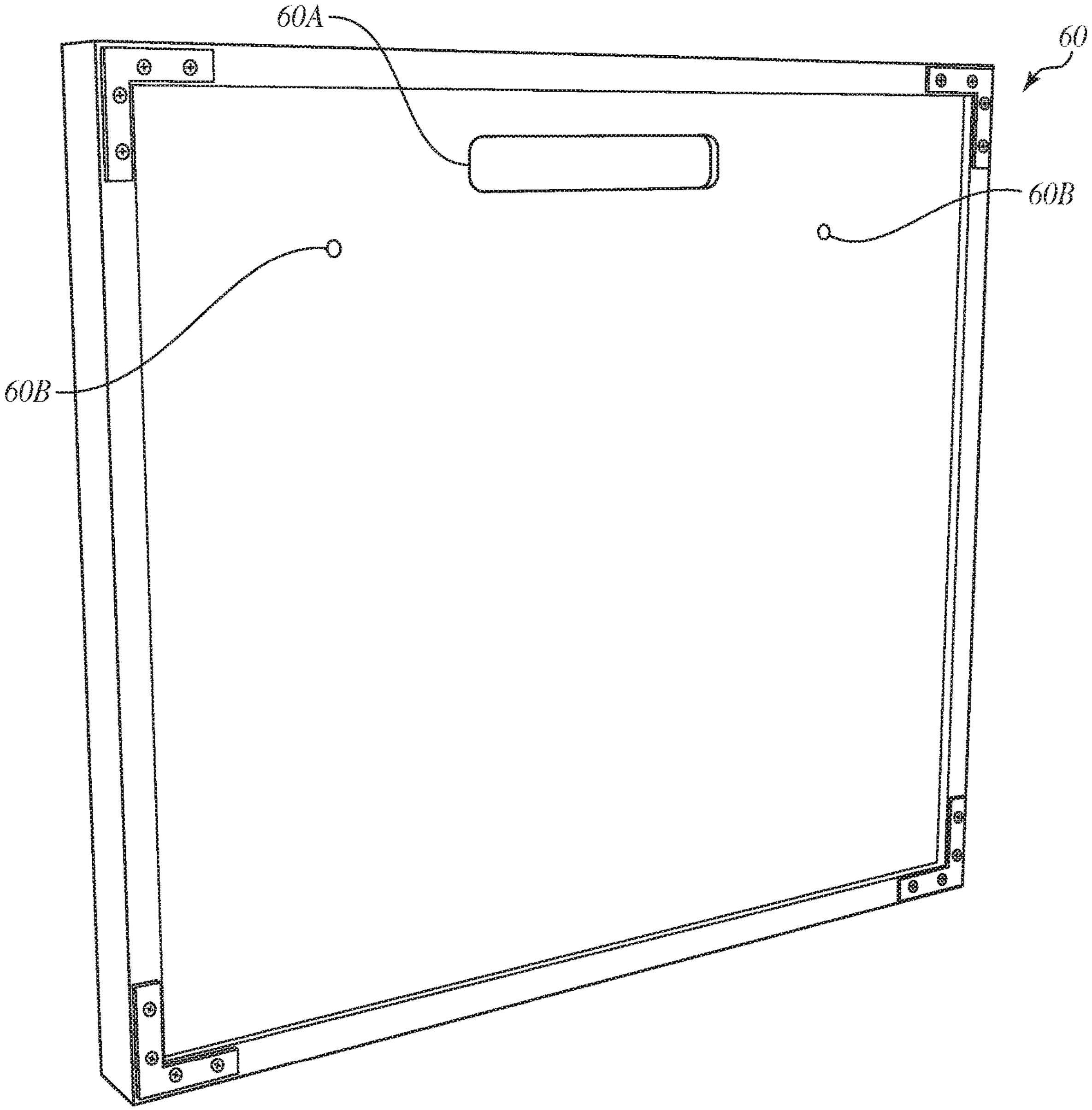
FIG. 9 shows a perspective view of a backing board according to embodiments of the invention.

In other embodiments shown in FIG. 9, the modular merchandising display 10 further includes a backing board 60 which is mountable over on the backside thereof with, for example, adhesives or suitable fasteners. Along with L-shaped side frame pieces 26, backing board 60 may be mounted to projections 54 and upper protrusion 46. Backing board 60 provide rigidity to modular merchandising display 10. In this embodiment, backing board 60 includes a handle hole 60A and mounting holes 60B. Mounting holes 60B are configured to cooperate with nails or brackets to allow modular merchandising display 10 to be mounted to a wall.

Figure 10C:
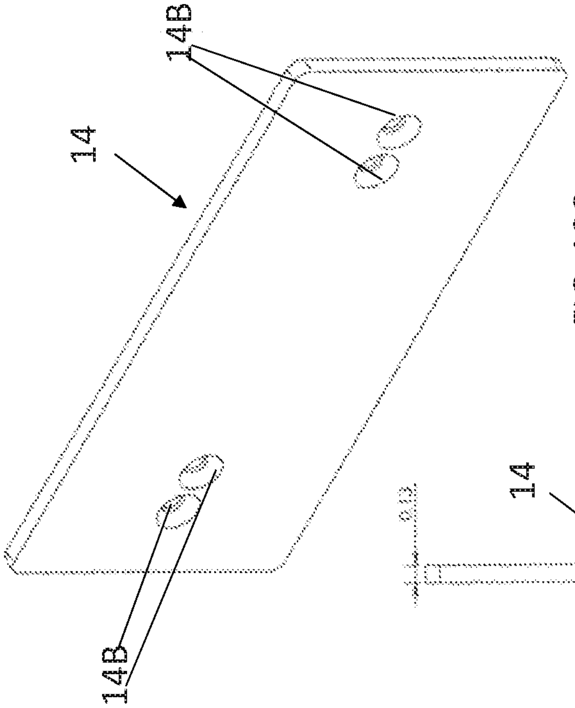
FIGS. 10A, 10B and 10C show front, side and perspective of a product base for a display piece according to embodiments of the invention.
Figure 10B:
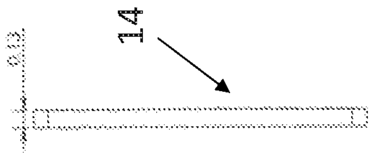
Figure 10A:
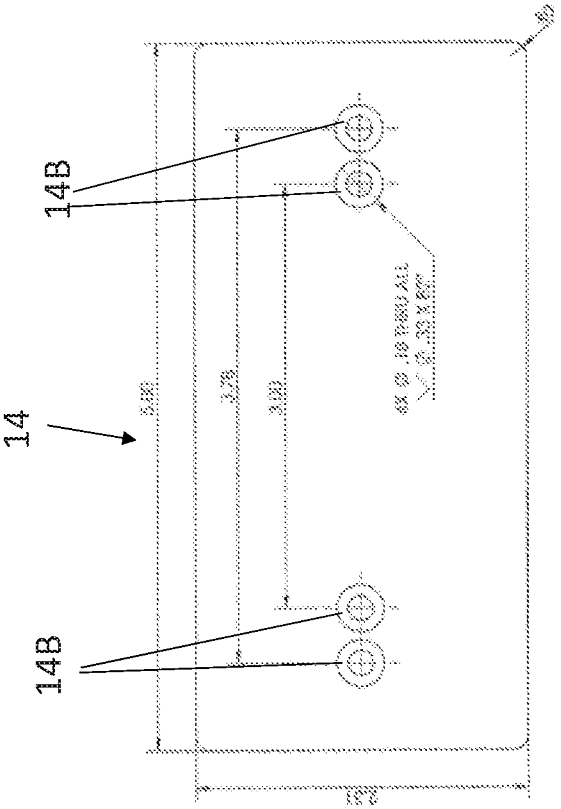

An embodiment of a rectangular product base 14 is shown in FIGS. 10A-10C having through holes 14B for mounting products 12. In the embodiment of FIGS. 10A-10C two pairs of through holes 14B are shown suitable for mounting a product 12 such as a pull handle. Each pair of spaced through holes 14B is disposed on one end of the rectangular product base 14 for mounting opposite end of the product.

An embodiment of a rectangular product base 214 is shown in FIGS. 20A-20D having scored through holes in mounting pieces 214 that are scored for one of two sets of through holes 214B (based on desired length of user) to then be punched/routed in order to receive a countersunk screw in which to attach to the product. The scored lines of the two optional through holes 214B eliminate the need for duplication of the same dimension clear product base 214 for two different length products 212A. 212B.

Figure 21:
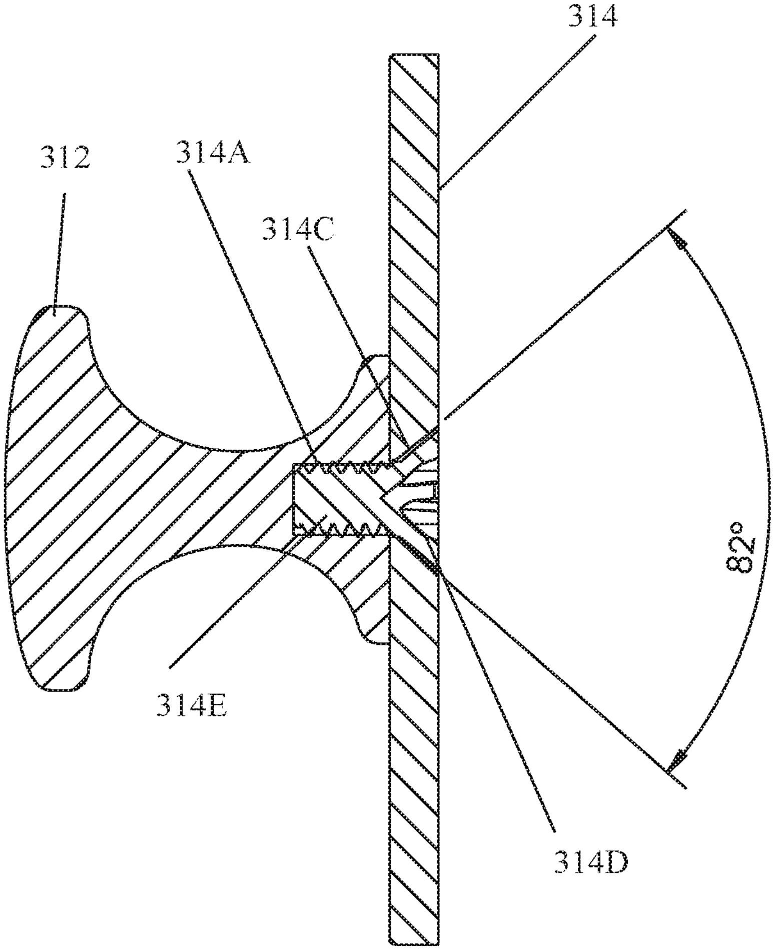
FIG. 21 shows a view of a product base having a countersink according to alternative embodiments.

An embodiment of a product base 314 is shown in FIG. 21 having a through hole 314A having at least one countersink 314C to allow a fastener head, such as a screw head 314D of a screw 314E, to sit flush with the edge of the product base 314 mounting material and allow the product base 314 to be able to tilt and drop without interference within display channels 20 to display a product 312. As shown in FIG. 21, the at least one countersink may be 82 degrees, for example.

Figure 22A:
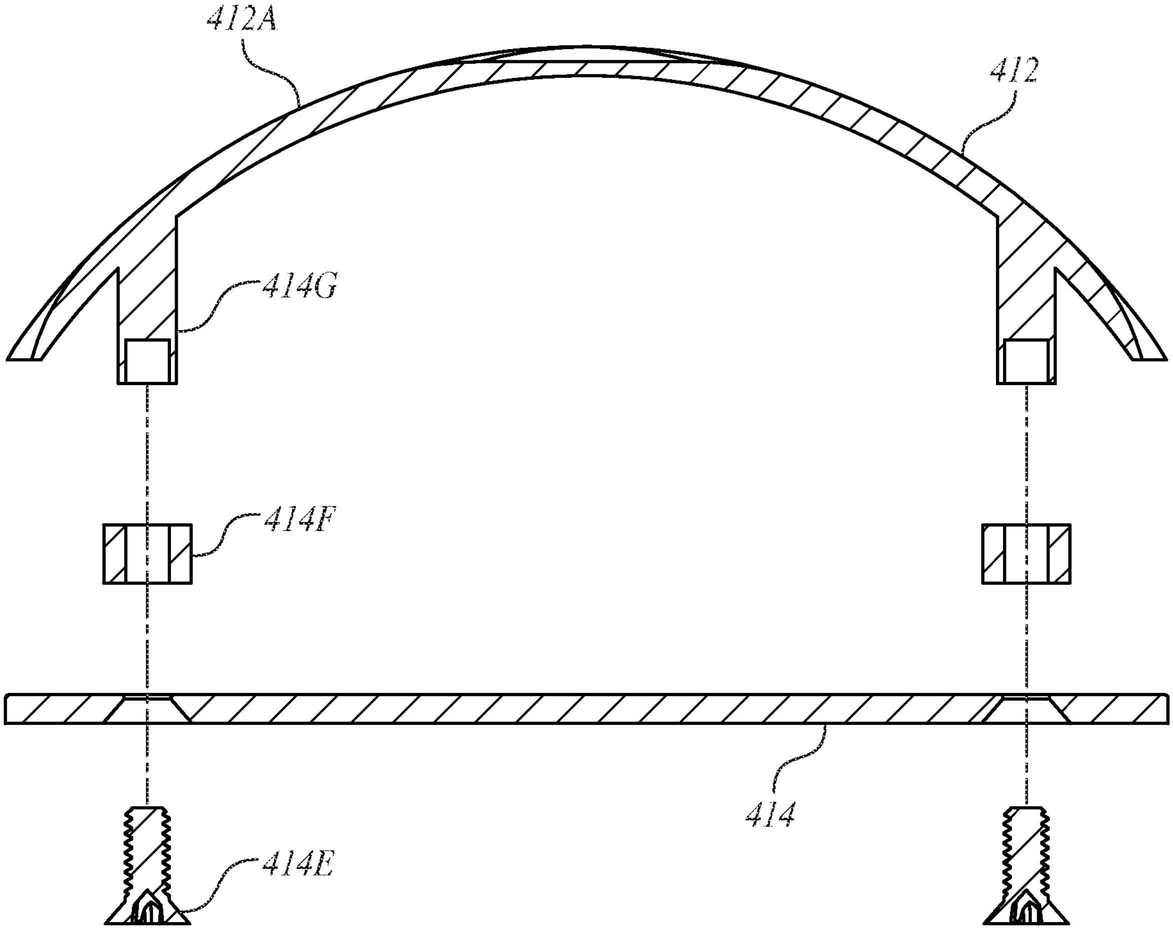
FIGS. 22A and 22B show exploded and side views of a product base according to alternative embodiments.
Figure 22B:
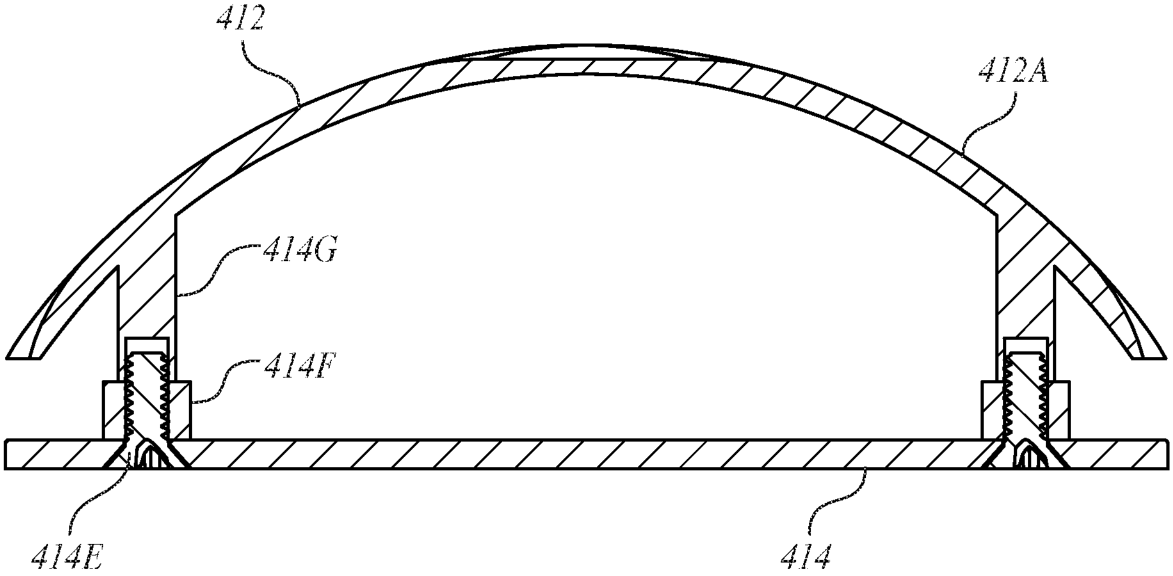

An embodiment of a rectangular product base 414 is shown in FIGS. 22A and 22B for displaying a cup pull 412 which is a type of decorative hardware having an elongated cup-like handle 412A with mounting fasteners 414E on each end thereof. Some of these cup pull profiles include a stem 414G in which to receive a fastener 414E during standard installation onto a cabinet door or drawer. Because of the design of the modular merchandising display 10 and its intended channel 20 height and depth, the angle required to tilt and drop the product attached to its a rectangular product base 414 is prohibited by the inherent design of certain stemmed cup pulls 412 due to the product's necessary projection. To offset this challenge, extenders 414F may be utilized between the stem 414G of cup pull 412 and the rectangular product base 414, held in place by the attachment fasteners 414E in which to raise the cup pull 412 away from directly touching the rectangular product base 414. This allows for this product style's rectangular product base 414 to still maintain the required degree tilt in order to drop into the modular display's channel 20 in which to "nest."

Figure 2B:
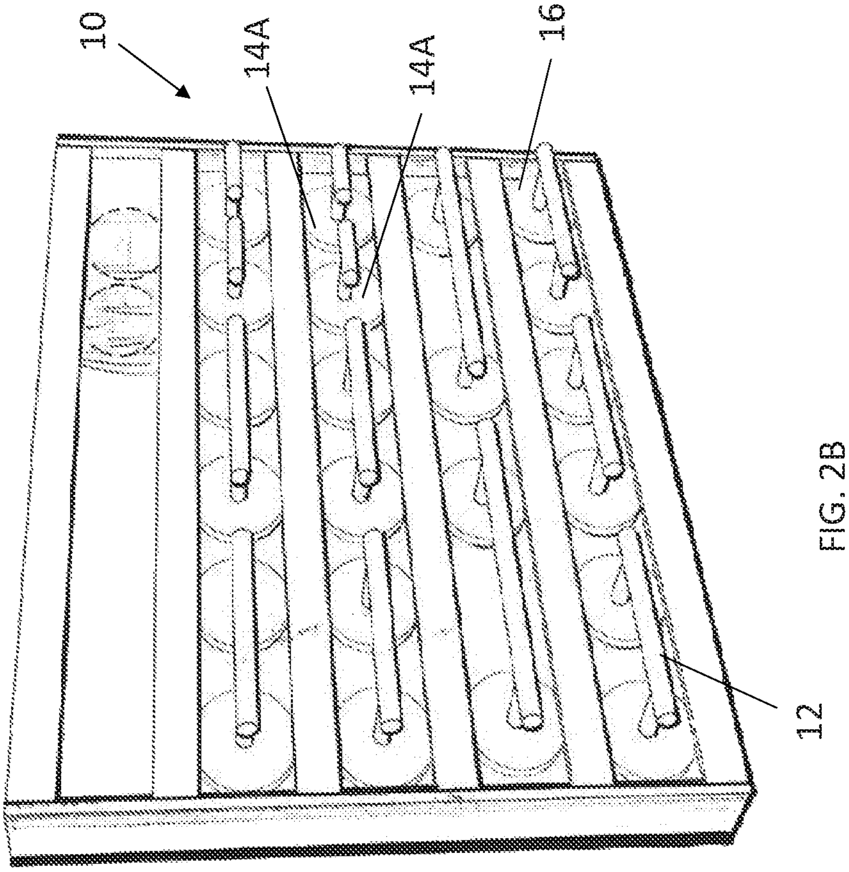
FIG. 2B shows a perspective view of the modular merchandising display of FIG. 2A.
Figure 2A:
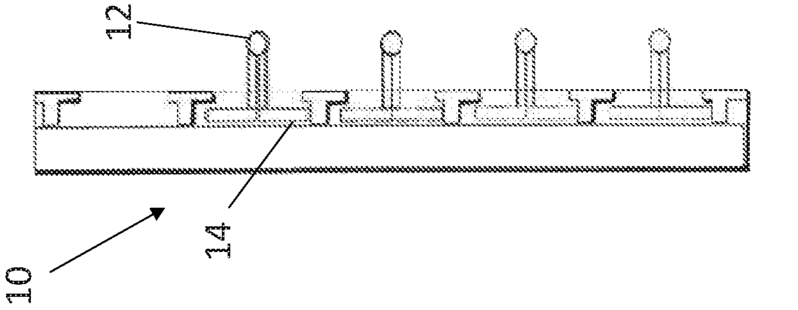
FIG. 2A shows a side view of the modular merchandising display according to embodiments of the invention.
Figure 2C:
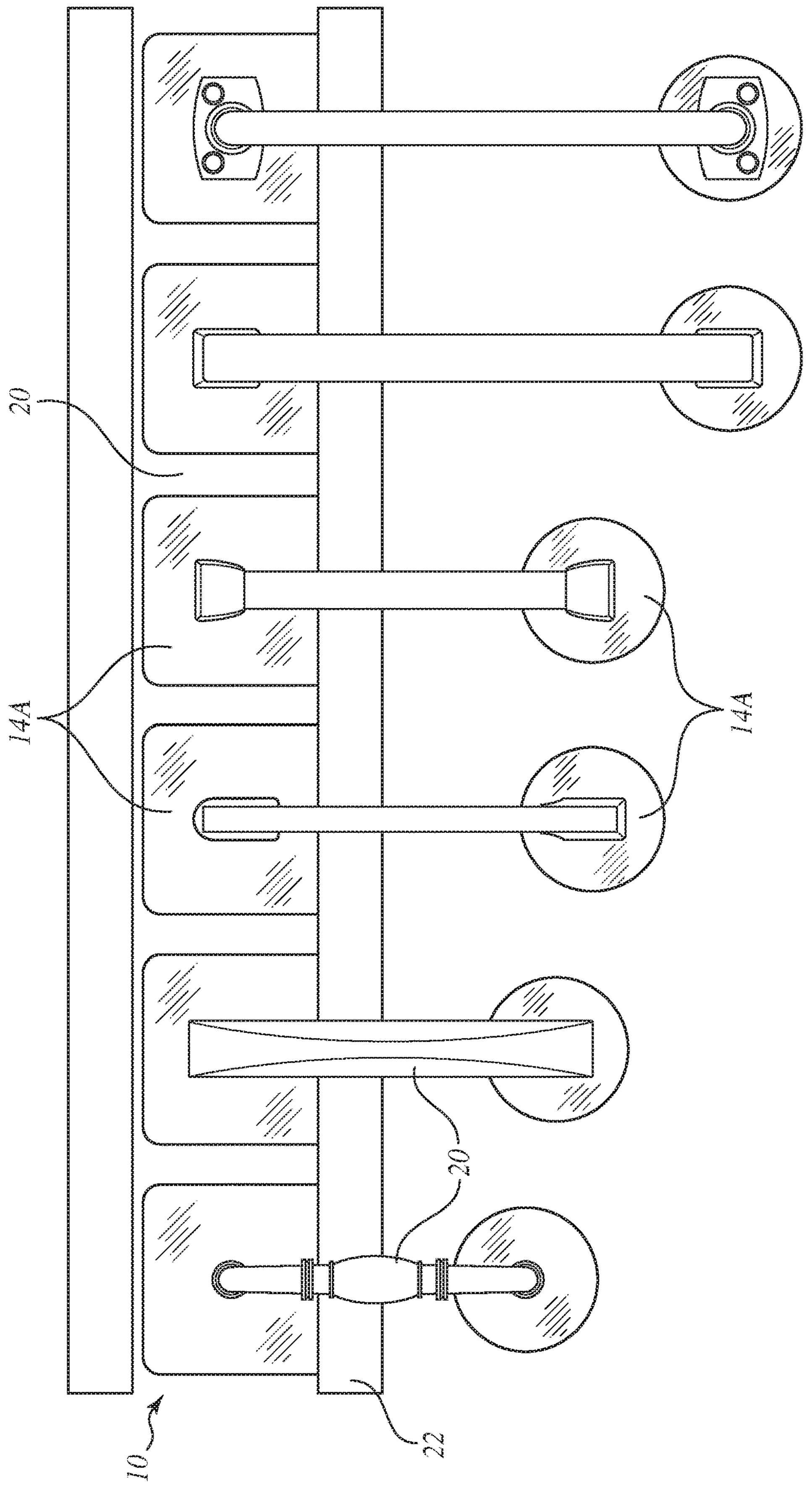
FIG. 2C shows a front view of the modular merchandising display with display pieces displaying products in a vertical orientation.

Product bases 14 may also comprise more than one base piece 14A. For example, product bases 14 may comprise two spaced apart base pieces 14A as shown by the circular base pieces in FIGS. 2A-2B. Each base piece 14A has a portion of a product 12 mounted thereon for displaying product 12 in a horizontal direction. In another example, FIG. 2C shows two spaced apart base pieces 14A displaying products 12 in a vertical orientation. In this example, the upper base piece 14A, when vertically oriented, is configured to nest within a display channel 20 of a slat wall piece 22.

Figure 11A:
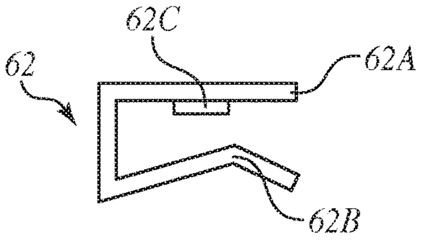
FIGS. 11A and 11B show top and perspective of a visualizer clip according to embodiments of the invention.
Figure 11B:
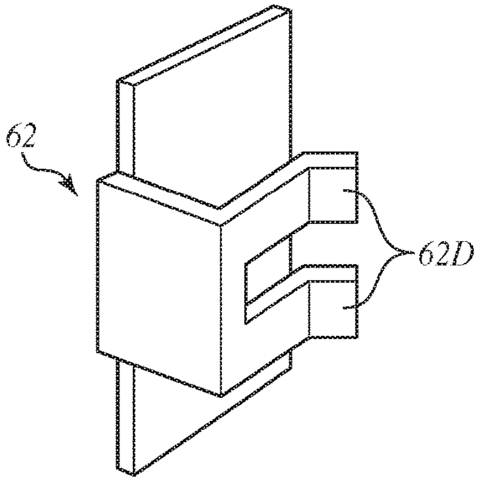
Figure 11C:
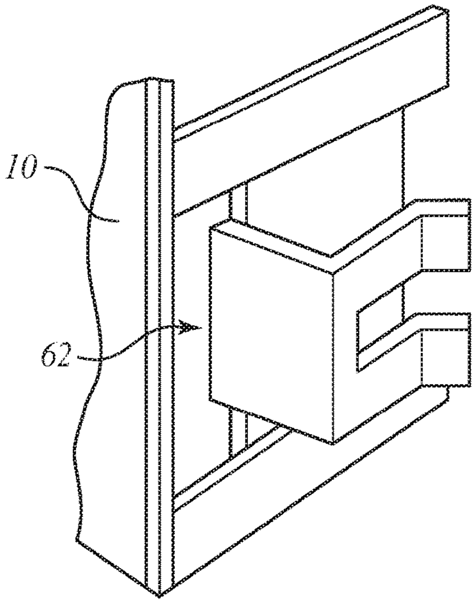
FIG. 11C show the backing piece including a visualizer clip of FIGS. 11A and 11B nested in a modular merchandising display according to embodiments of the invention.
Figure 11D:
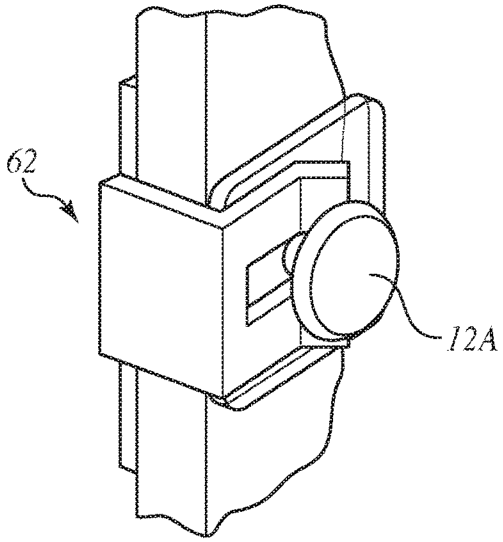
FIGS. 11D and 11E show a backing piece including a visualizer clip holding a knob and a pull, respectively and clipped to a cabinet door according to embodiments of the invention.
Figure 11E:
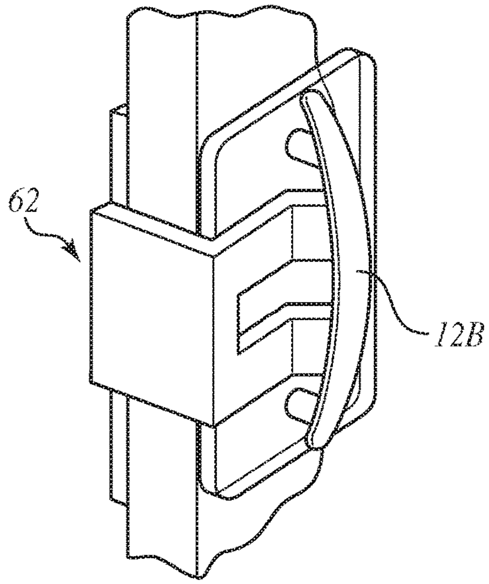

In other embodiments shown in FIGS. 11A-11E, visualizer clip 62 has a U-shaped side profile and is configured to allow for hands-free visualization of a product such as a knob 12A or pull 12B against a cabinet door 64 (FIGS. 11D and 11E). Clip 62 has a first leg 62A which is configured to nest within channels 20A and 20B for storage when not in use, as shown in FIG. 11C. First leg 62A includes a rubber stop 62C mounted on an interior side. Clip 62 has a second leg 62B having two resilient prongs 62D configured to hold a product 12A, 12B therebetween. In use, clip 62 is clipped to a cabinet door 64 such that rubber stop 62C is pressed against a rear side of the cabinet door 64 and a display piece 16 having a product 12 mounted thereon is pressed to the front side of the cabinet door 64 by resilient prongs 62D such that a user may visualize the product 12 on the cabinet door 64 without having to hold the product 12 up to the cabinet door 64. In certain embodiments, visualizer clip 62 is made from a clear, transparent material in order to be able to visualize both the knob 12A or pull 12B, and also e.g. the cabinet door.

Figure 12A:
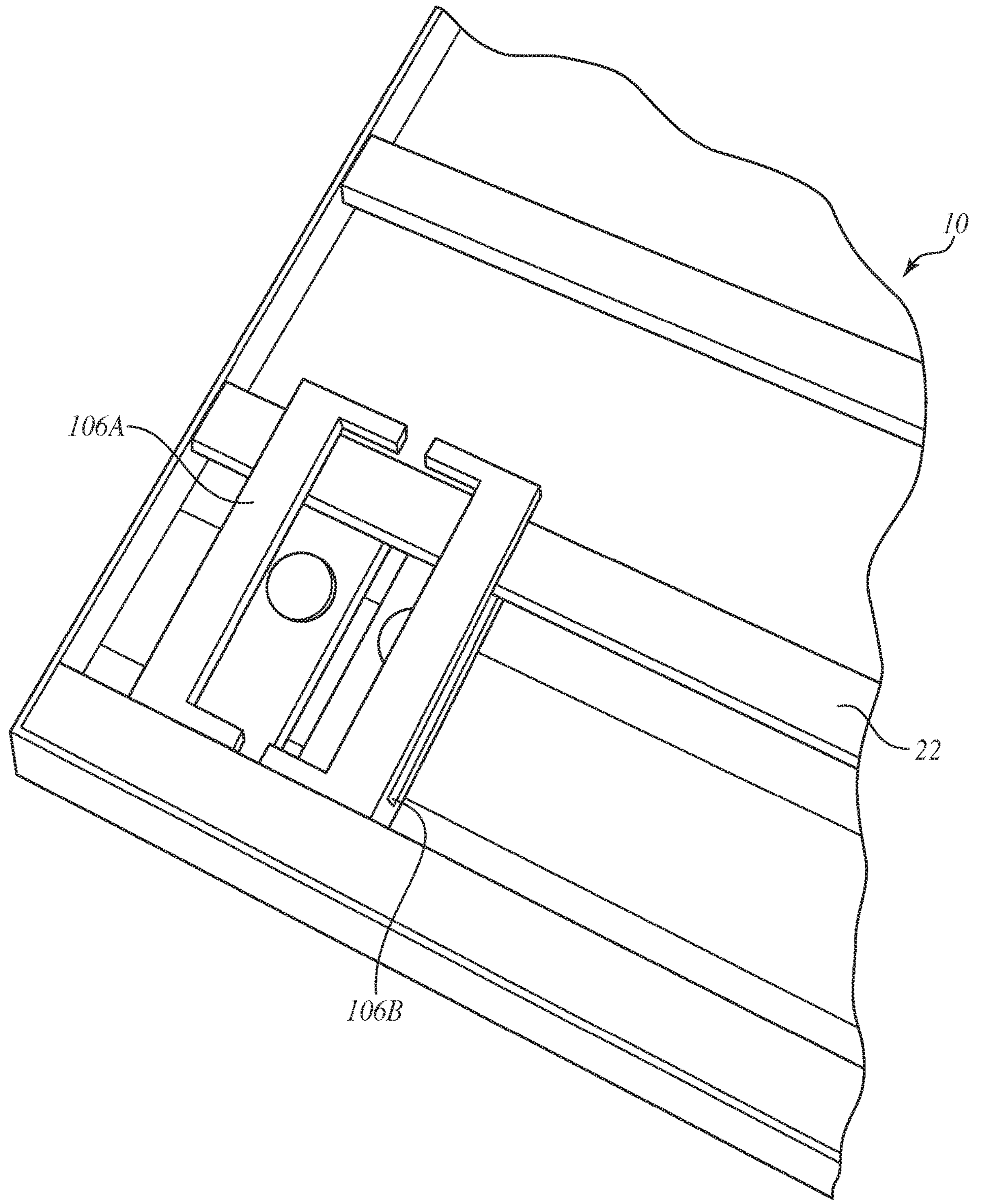
FIG. 12A shows a front view of a pair of visualizer clips nested in a modular merchandising display for storage when not in use according to another embodiment of the invention.
Figure 12C:
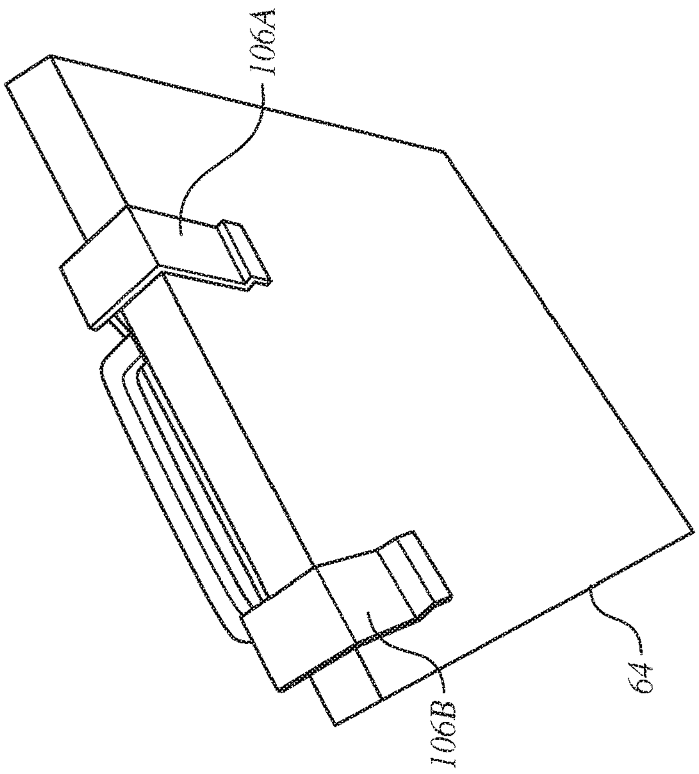
FIG. 12C shows a rear perspective view of a pair of visualizer clips of FIG. 12A in a orientation position on a cabinet door.
Figure 12B:
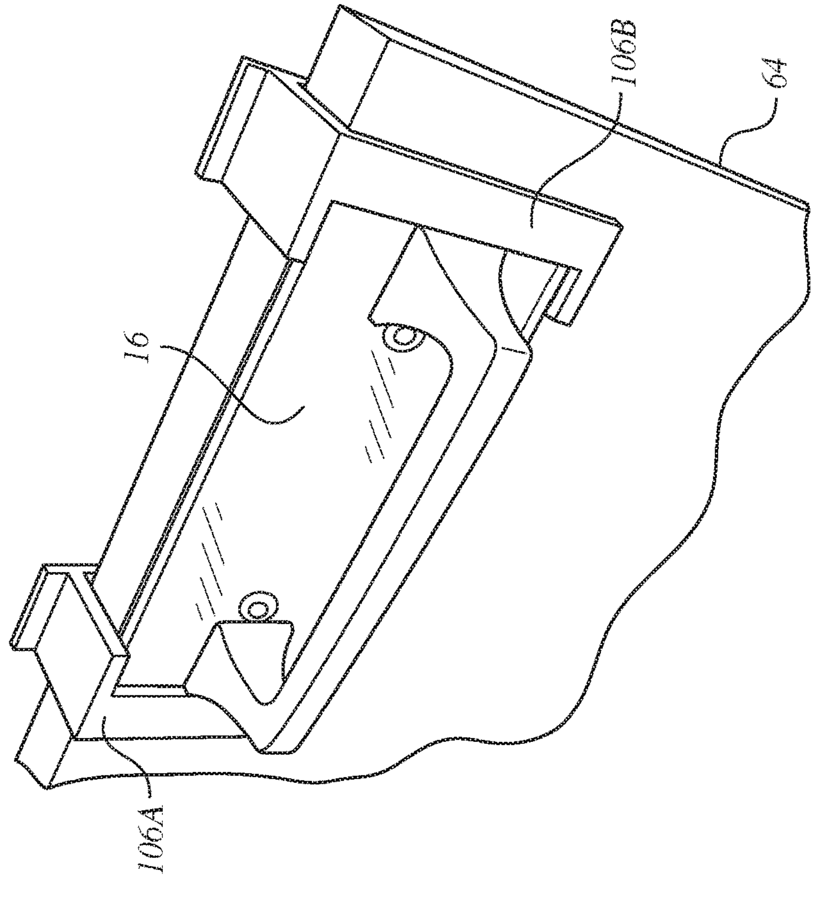
FIG. 12B shows a front view of a pair of visualizer clips of FIG. 12A in a horizontal orientation on a cabinet door.
Figure 12E:
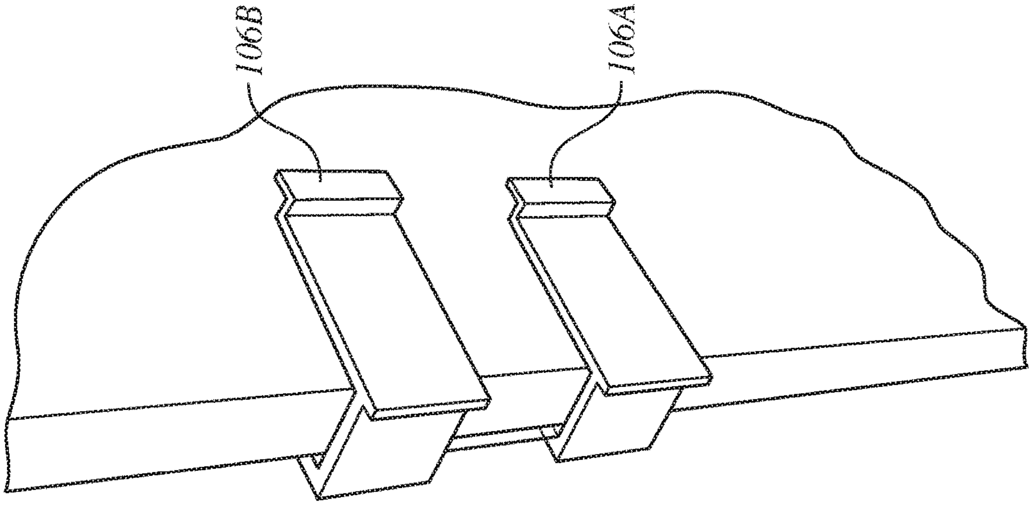
FIG. 12E shows a rear perspective view of a pair of visualizer clips of FIG. 12A in a vertical orientation on a cabinet door.
Figure 12D:
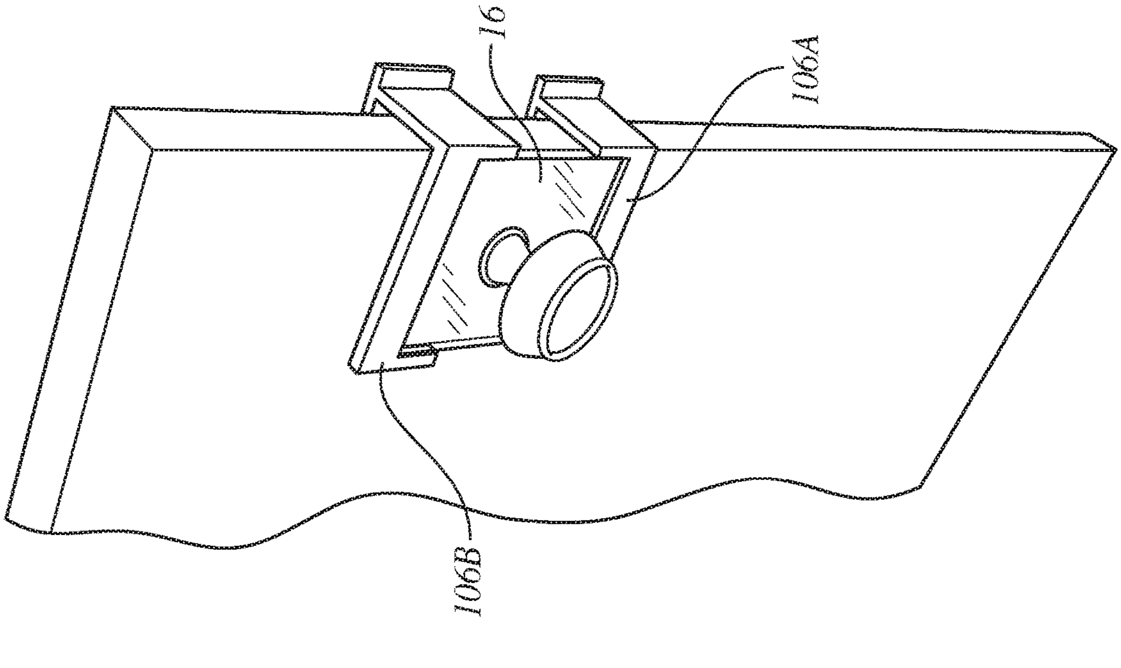
FIG. 12D shows a front view of a pair of visualizer clips of FIG. 12A in a vertical orientation on a cabinet door.
Figure 13A:
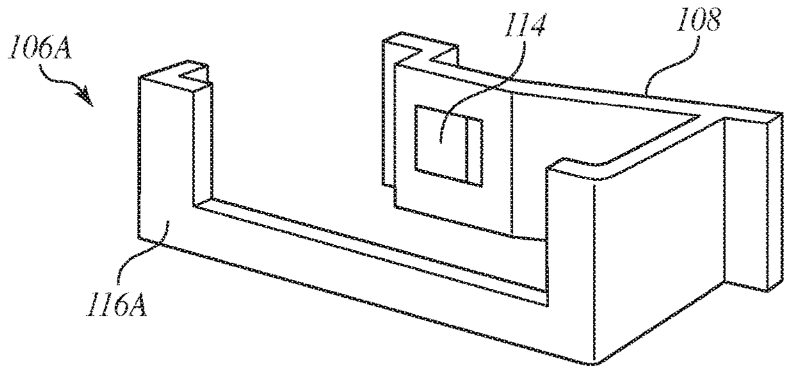
FIGS. 13A and 13B show front perspective and side schematic views of a visualizer clip of FIG. 12A.
Figure 13B:
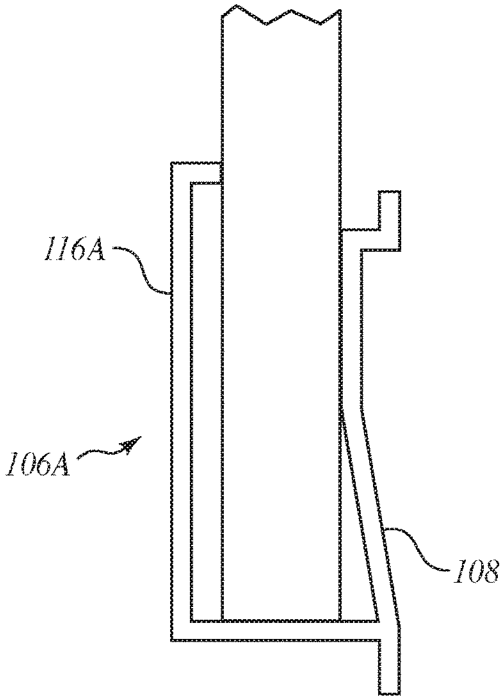
Figure 13C:
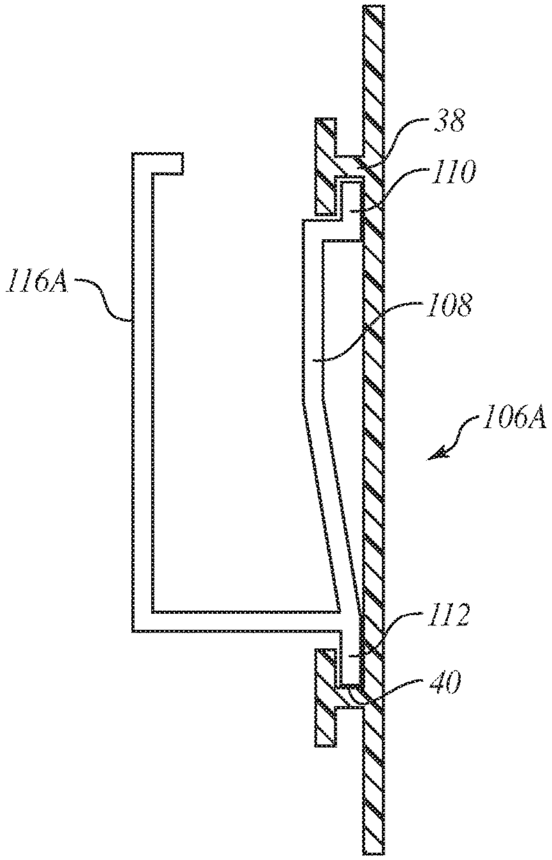
FIG. 13C shows a side schematic view of a visualizer clip of FIG. 12A nested in a modular merchandising display for storage when not in use.
Figure 14:
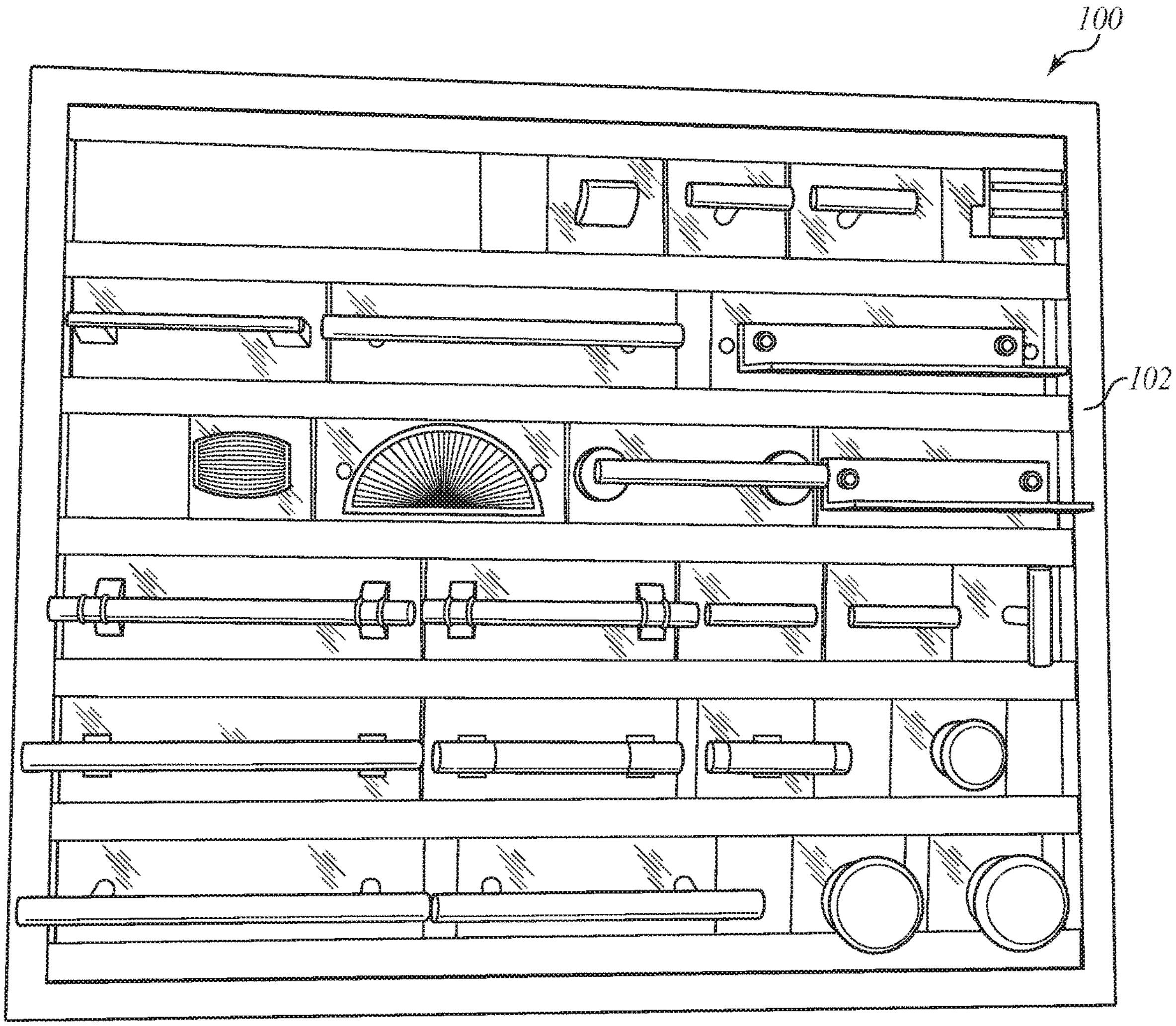
FIG. 14 shows a front view of the modular merchandising display according to alternative embodiments of the invention.
Figure 15C:
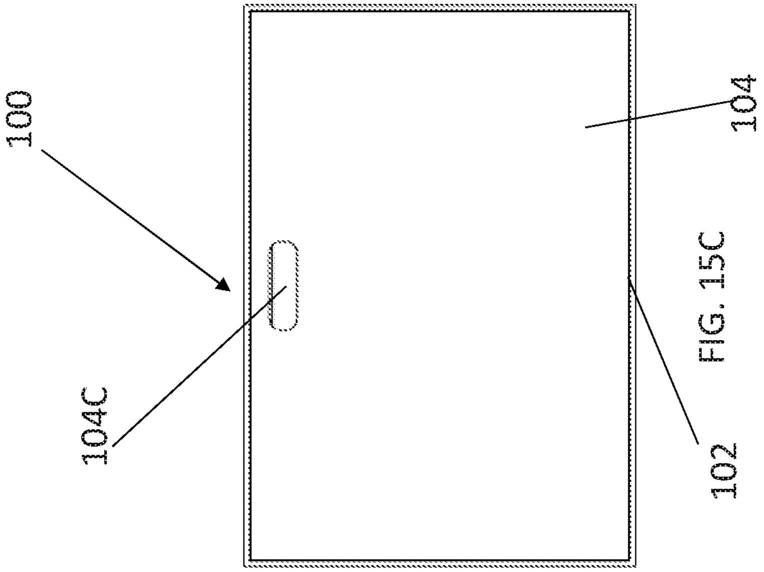
FIGS. 15A, 15B and 15C show front, side and rear views of the modular merchandising display of FIG. 14 according to alternative embodiments of the invention.
Figure 15B:
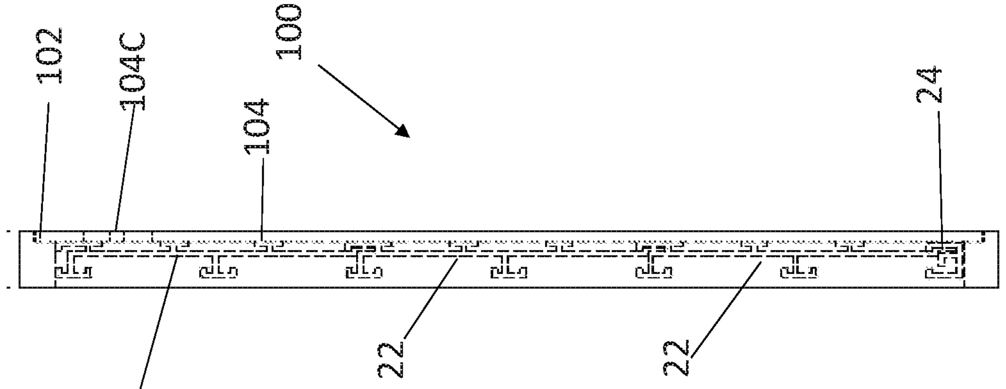
Figure 15A:
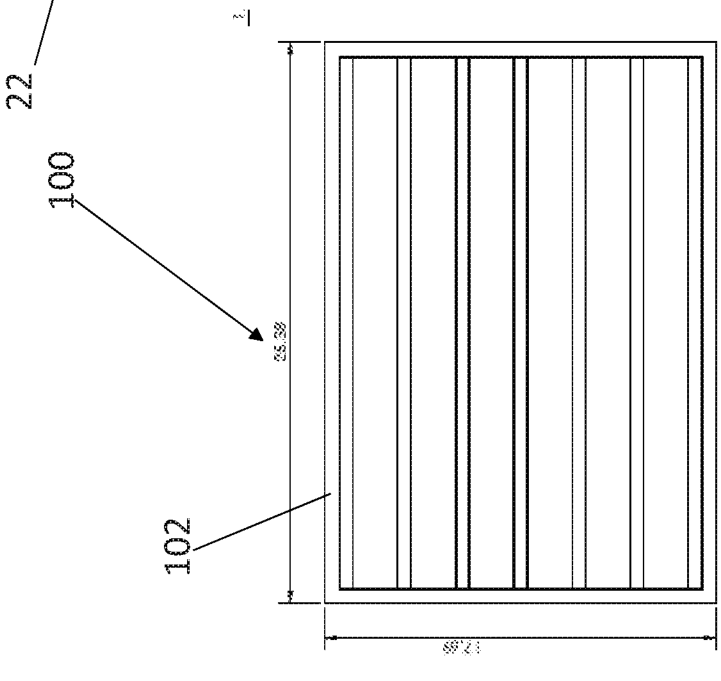
Figure 16C:
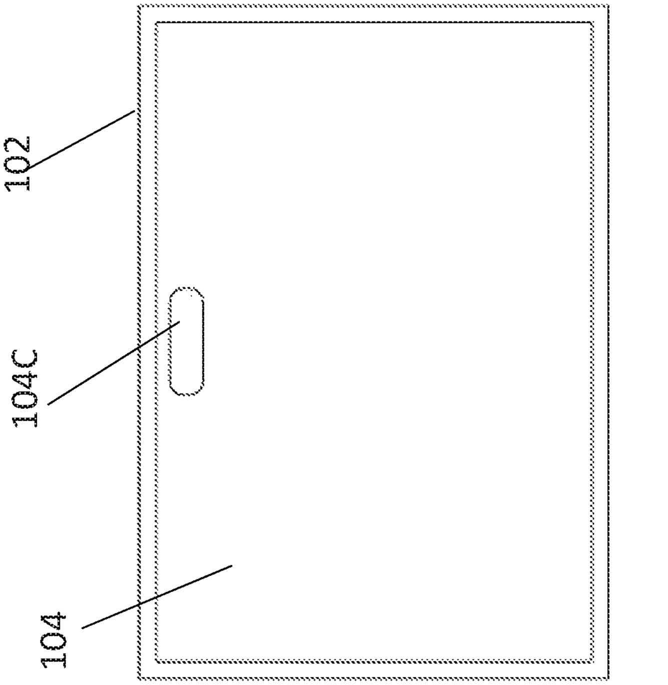
FIGS. 16A, 16B and 16C show front, side and rear views of the frame and frame back of the modular merchandising display of FIG. 14 according to alternative embodiments of the invention.
Figure 16B:
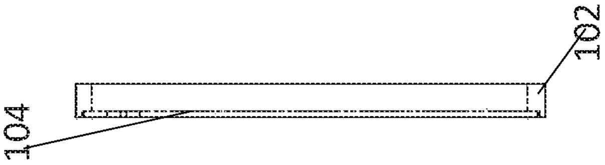
Figure 16A:
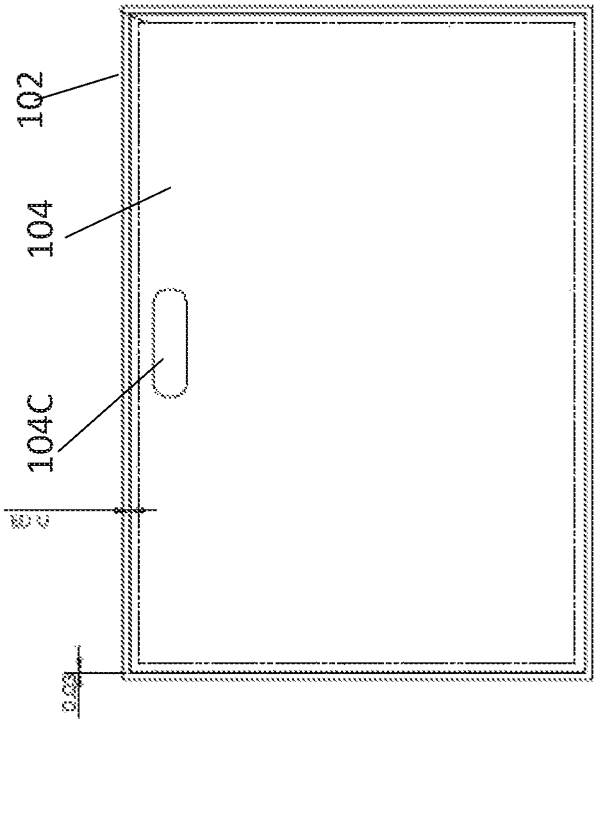
Figures 17A, 17B:
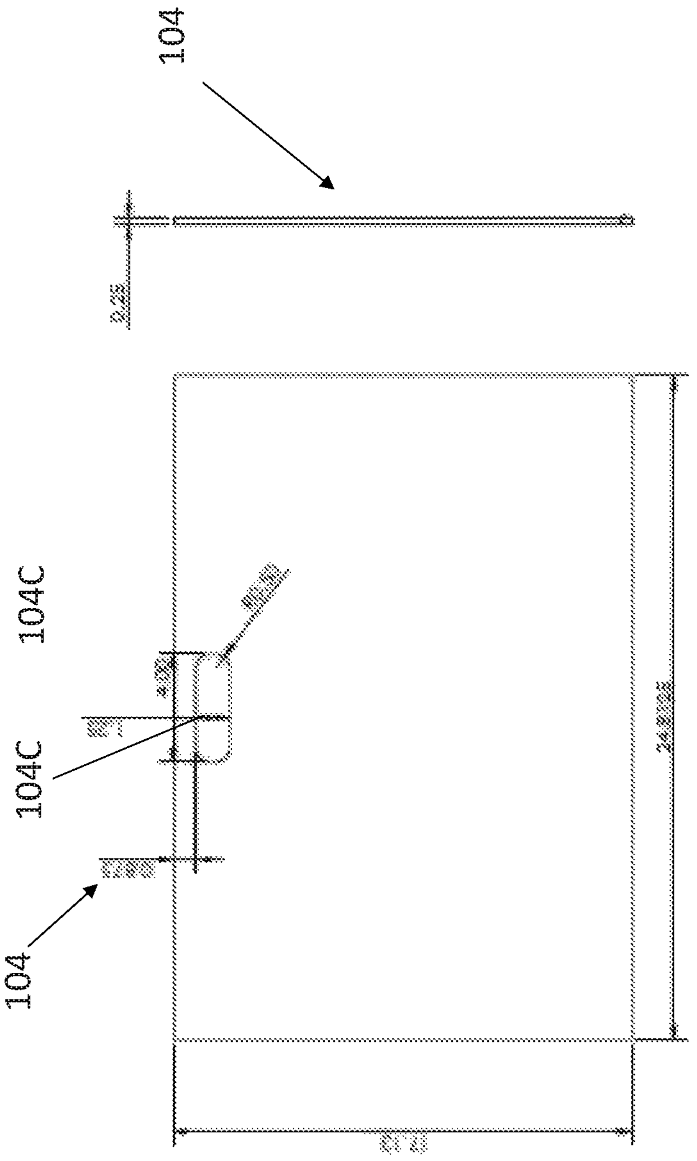
FIGS. 17A and 17B show rear and side views of the frame back of the modular merchandising display of FIG. 14 according to alternative embodiments of the invention.
Figures 18A, 18B, 18C:
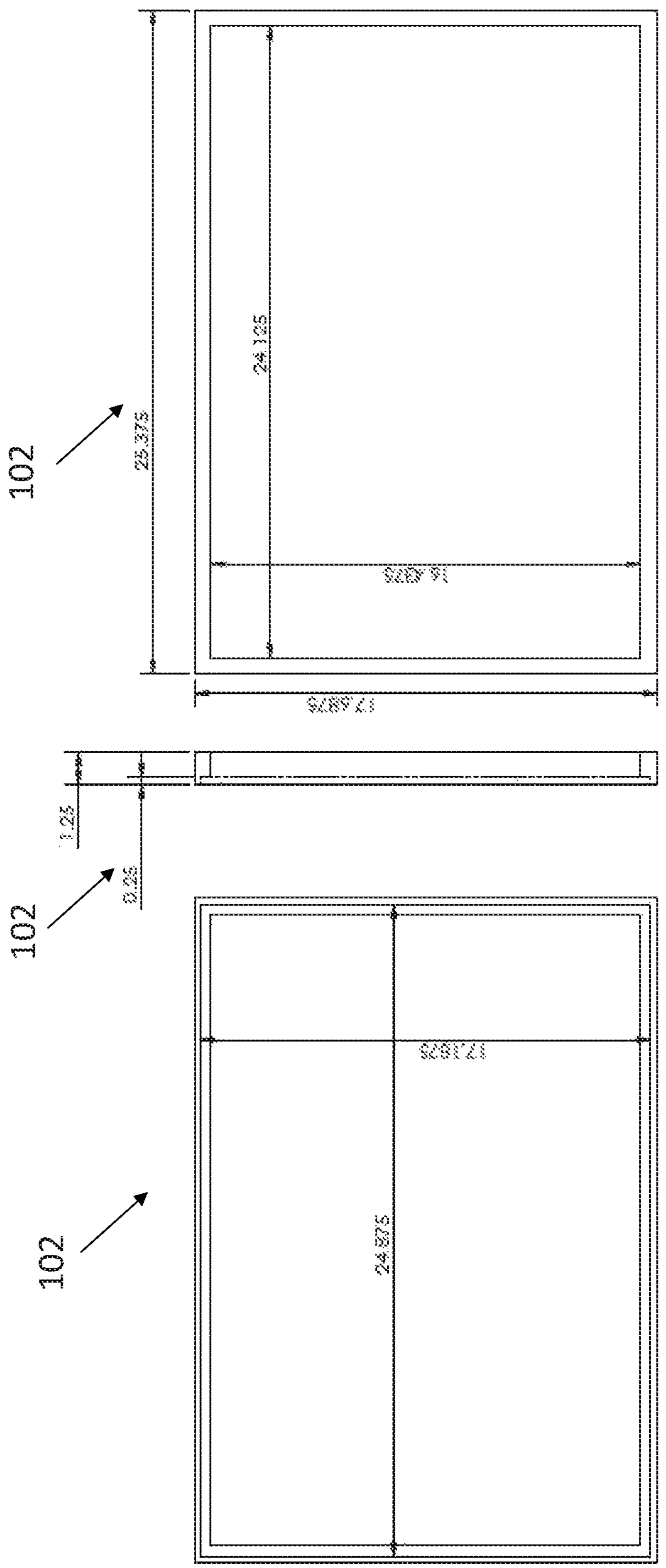
FIGS. 18A, 18B and 18C show front, side and rear views of the frame of the modular merchandising display of FIG. 14 according to alternative embodiments of the invention.
Figure 19C:
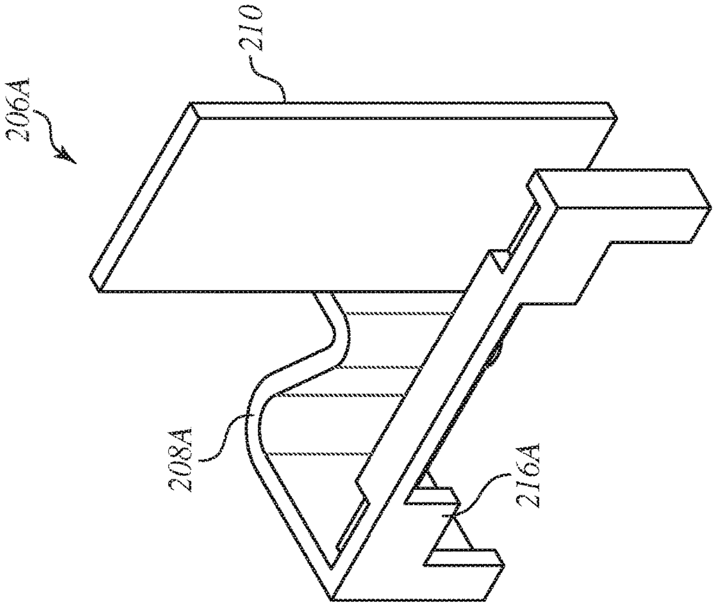
FIGS. 19A-19C show side, front and perspective views of a first visualizer clip according to alternative embodiments.
Figure 19A:
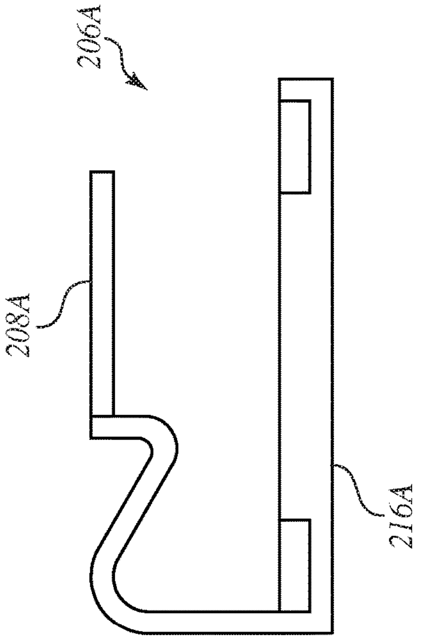
Figure 19B:
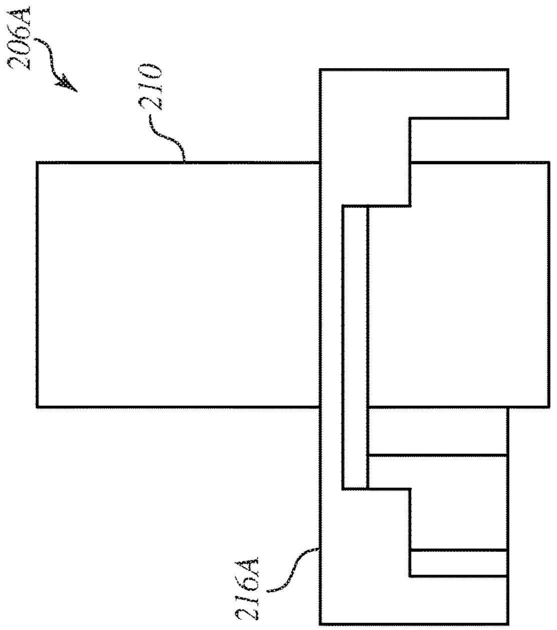
Figure 19F:
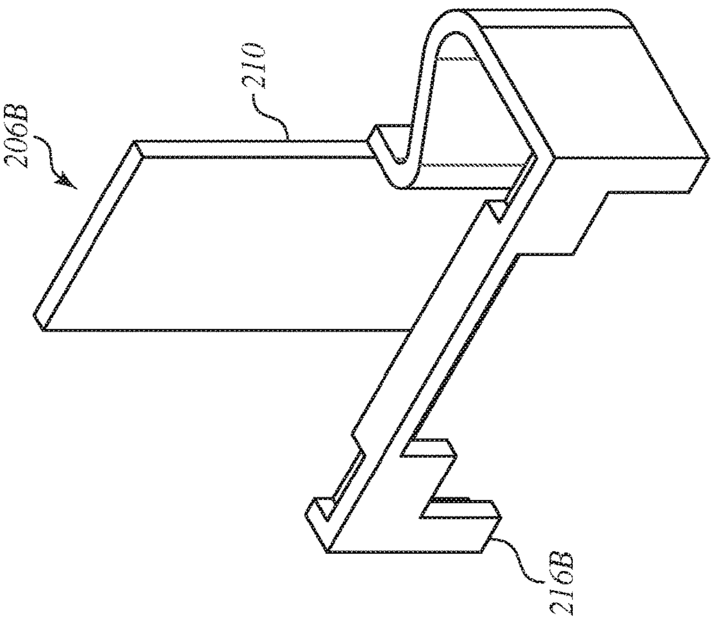
FIGS. 19D-19F show side, front and perspective views of a second visualizer clip according to alternative embodiments.
Figure 19D:
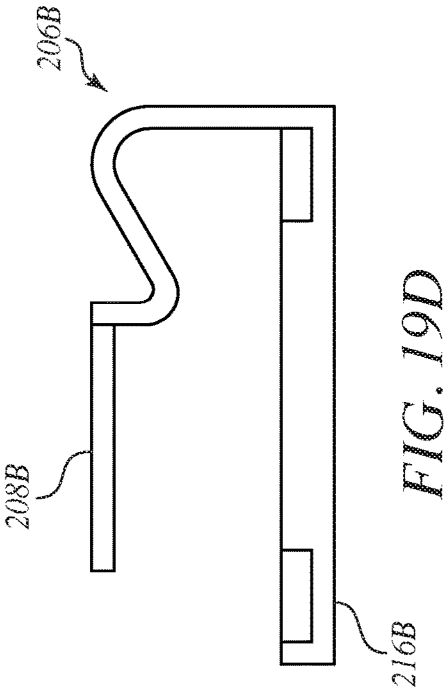
Figure 19E:
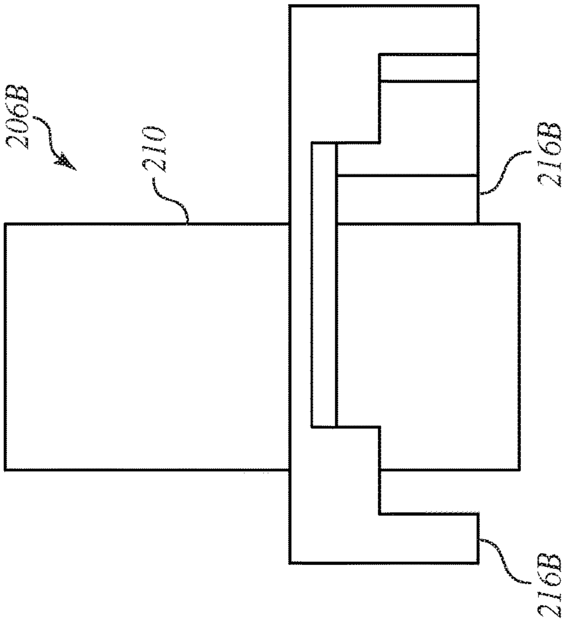
Figure 19I:
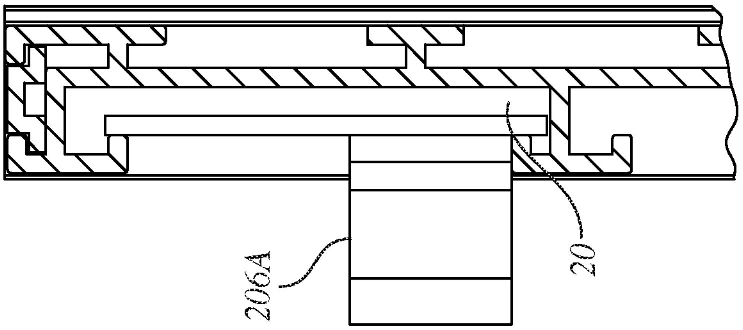
FIGS. 19G-19I show front, side and detail views of a display system using the visualizer clips of FIGS. 19A-19F.
Figure 19H:
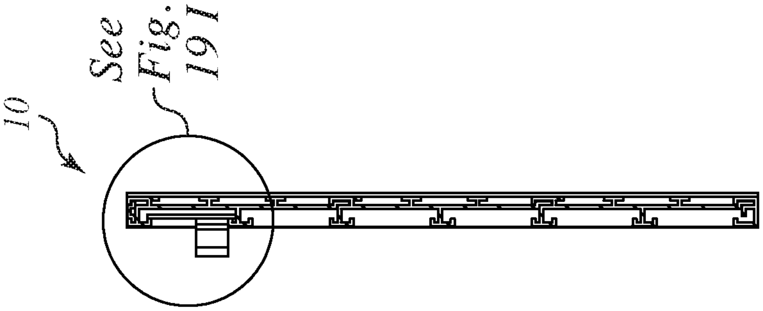
Figure 19G:
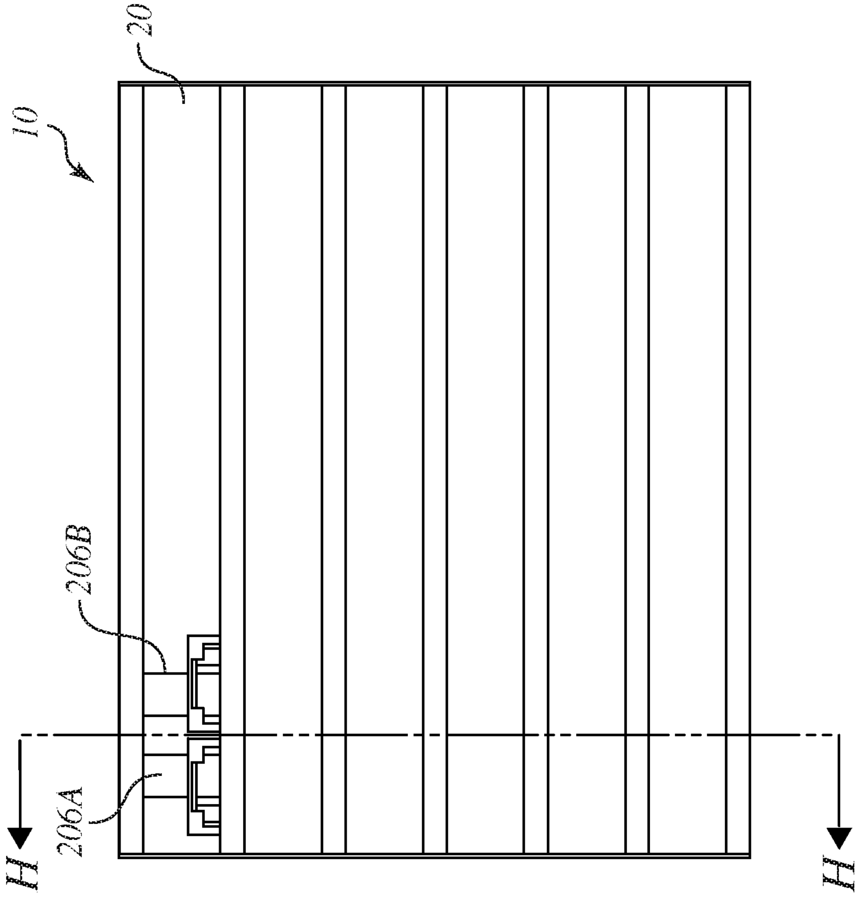
Figure 19J:
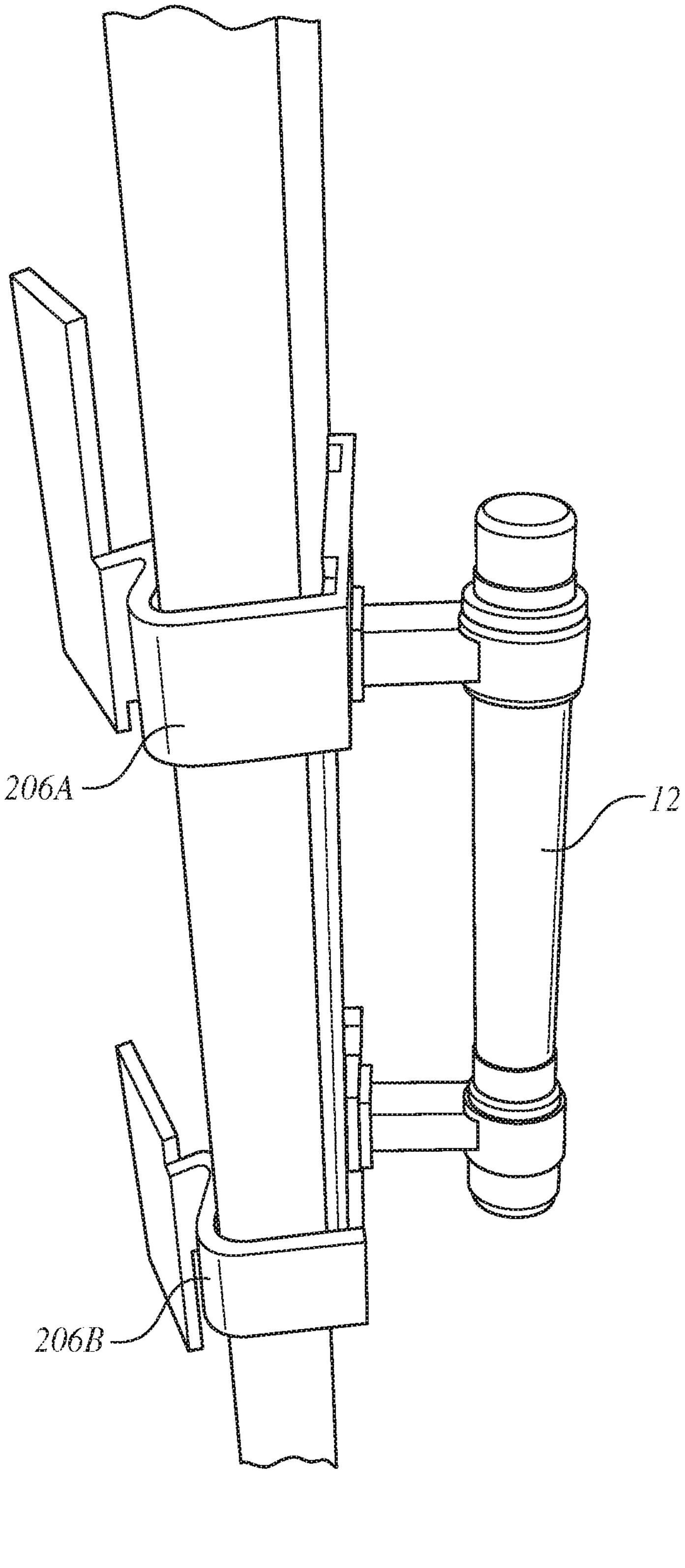
FIG. 19J shows a perspective view of the visualizer clips of FIGS. 19A-19F in use on a cabinet door.
Figure 20A:
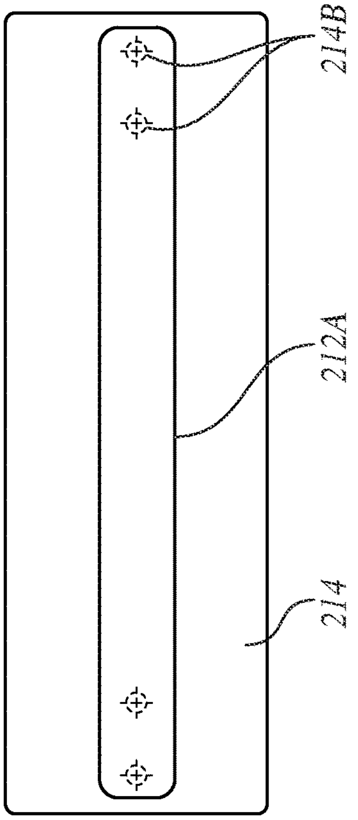
FIGS. 20A-20B show top and side views a rectangular product base according to alternative embodiments.
Figure 20B:
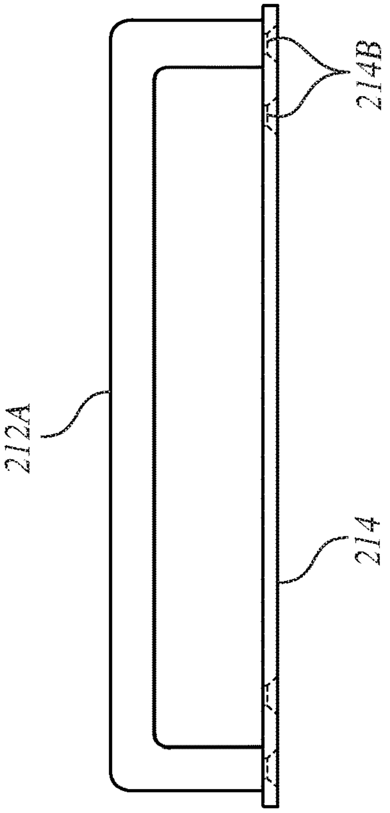
Figure 20C:
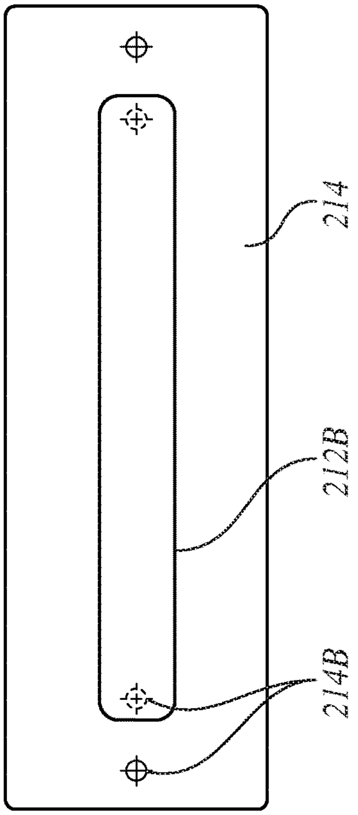
FIGS. 20C-20D show top and side views a rectangular product base according to alternative embodiments.
Figure 20D:
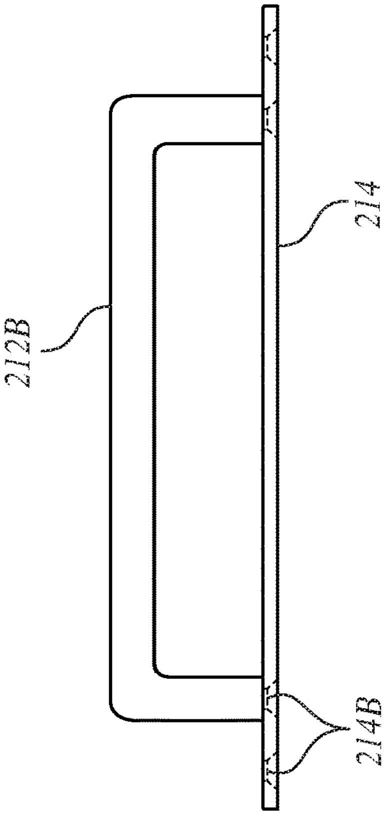

In other embodiments shown in FIGS. 12A-13C, a pair of visualizer clips 106A, 106B is shown. Each pair includes a first clip 106A and a second-clip 106B configured to hold a display piece 16 there between. As shown in FIGS. 12A and 13C, visualizer clips 106A, 106B are configured to be held in the modular merchandising display 10 for storage. As shown in FIGS. 12B and 12C, visualizer clips 106A, 106B may clip over a top edge of a cabinet door to hold a display piece in a horizontal orientation. As shown in FIGS. 12D and 12E, visualizer clips 106A, 106B may clip over a side edge of a cabinet door to hold a display piece in a vertical orientation. In this embodiment, each clip 106A, 106B has a first leg 108 which is configured to nest within channels 20A and 20B for storage when not in use, as shown in FIG. 13C. Specifically, first leg 108 includes upper and lower flanges 110, 112 which are insertable into grooves 36, 38, 40 and 42 of slat wall piece 22 by flexing first leg 108 which will then apply pressure on grooves 36, 38, 40 and 42 once inserted. First leg 108 also includes a rubber stop 114 mounted on an interior side configured to contact the interior surface of a cabinet door. Second groove 38 and third groove 40 are schematically represented in FIG. 13C. In certain embodiments, the second legs 116A of each pair of visualizer clips 106A, 106B, respectively, may have C-shapes which face each other in use. In certain embodiments, visualizer clips 106A and 106B are formed from flexible transparent material such as an acrylic or plexiglass material.

In other embodiments shown in FIGS. 19A-19J, a pair of visualizer clips 206A, 206B are shown. Like visualizer clips 106A, 106B, visualizer clips 206A, 206B are configured to clip over a top edge of a cabinet door to hold a display piece in a horizontal orientation. Visualizer clips 206A, 206B are configured to be able to be stored in a modular merchandising display 10 and are also configured to clip on cabinet doors of varying thicknesses within a dealer environment Visualizer clips 206A, 206B may be formed from a variety of materials that accommodated spring-back flexibility but still withhold the correct levels of tension in which to visualize cabinet hardware, bath accessories, hooks, etc. against the cabinet doors, for example, between 0.5 and 1 inch thicknesses. Visualizer clips 62, 106A, 106B may also be formed by the same materials as visualizer clips 206A, 206B. The materials in visualizer clips 62, 106A, 106B, 206A, 206B may be clear plastic material, painted colors or woodgrains to better blend in with cabinet doors to provide a better visual experience.

Each visualizer clip 206A, 206B has a first leg 208 configured to have spring back flexibility, and a substantially C-shaped second leg 216A. 216B. First leg 208 may have a substantially rectangular nesting portion 210 which is disposed on first leg 208 in a substantially transverse and offset orientation. Rectangular nesting portion 210 has opposing sides 210A and 210 B which are configured to nest in channels 20A and 20B for storage of the visualizer clip 206A, 206B when not in use.

In other embodiments shown in FIGS. 14-18C, a modular merchandising display 100 is configured to include slat wall pieces 22 and may also include display pieces 16 and visualizer clips 62 as discussed above. In this embodiment, modular merchandising display 100 does not include L-shaped side-frame pieces 26 and a top cap piece 28 as discussed above. In this embodiment, modular merchandising display 100 includes a frame 102 and a frame back 104 which securely hold the slat wall pieces 22 and an end cap piece 24. In this embodiment, frame 102 is rectangular in shape having four sides forming a rectangular opening configured to receive slat wall pieces 22 and end cap piece 24. The four sides may be formed from a unitary piece or may be composed of two or more individual pieces. In this embodiment, frame back 104 is also received in frame 102 and forms the rear of the modular merchandising display 100. In this embodiment, frame back 104 includes a handle hole 104A. Also, in this embodiment frame 102 and frame back 104 are formed from wood but may be formed from any suitable material such as metal or plastic.

Figure 23:
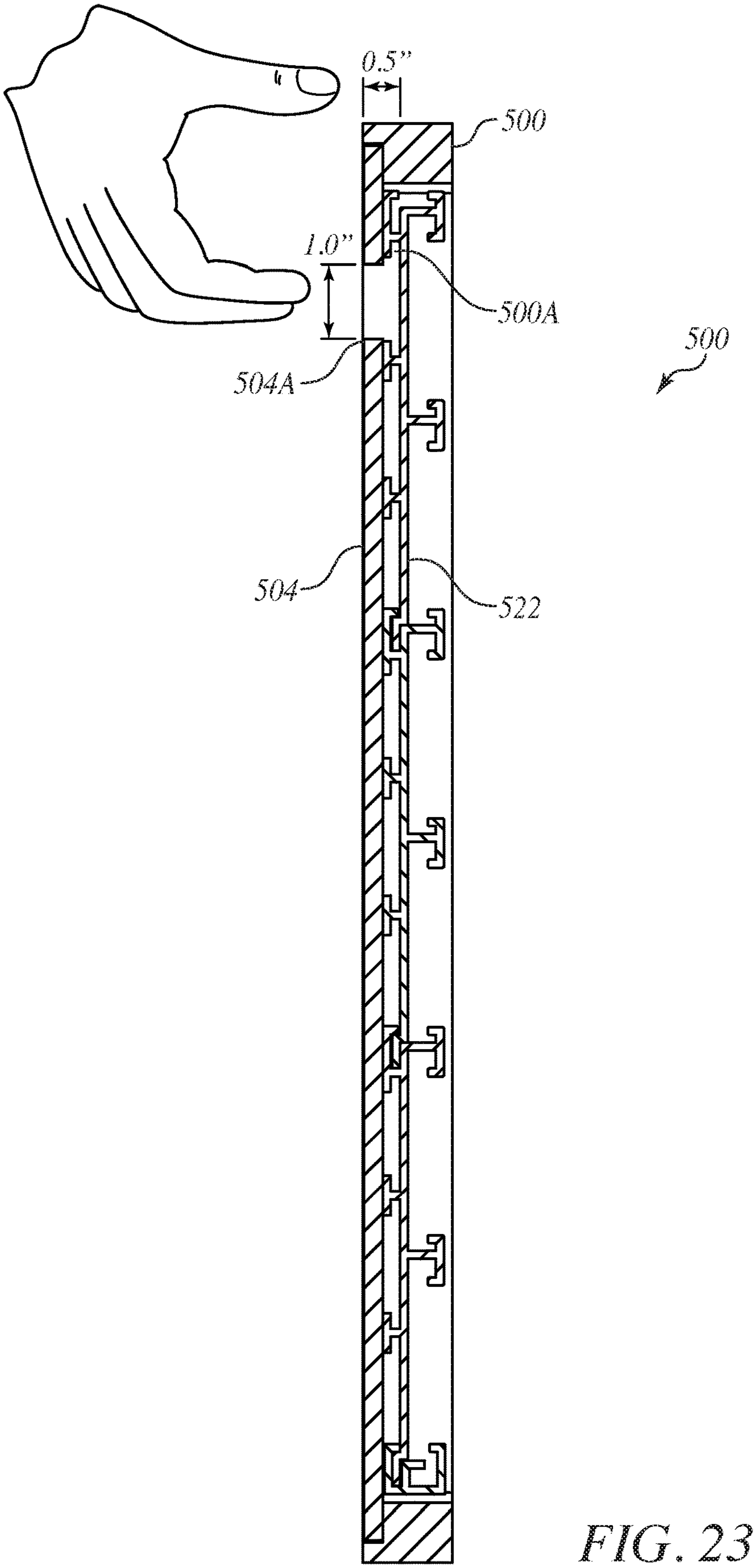
FIG. 23 shows a view of the modular merchandising display according to alternative embodiments.

In other embodiments shown in FIG. 23, a modular merchandising display 500 includes a frame back 504 which is flush with the outer edge of the frame 502. There is a slight gap from the internal side of the interlocking slat wall pieces 522 (back exterior) to the interior side of the frame back 504 forming gripping area 500A This embodiment includes routed out handle hold 504A that may be larger than handle hole 104A of FIGS. 14-18C. This larger handle hole 504A size and gripping area 500A provide additional wrap-around fingertip grip ability and allows a user to position this modular merchandising display 500 to line up and then drop the frame back 504 onto two appropriately sized screws/screw heads should the application require mounting to a wall.

Figure 24:
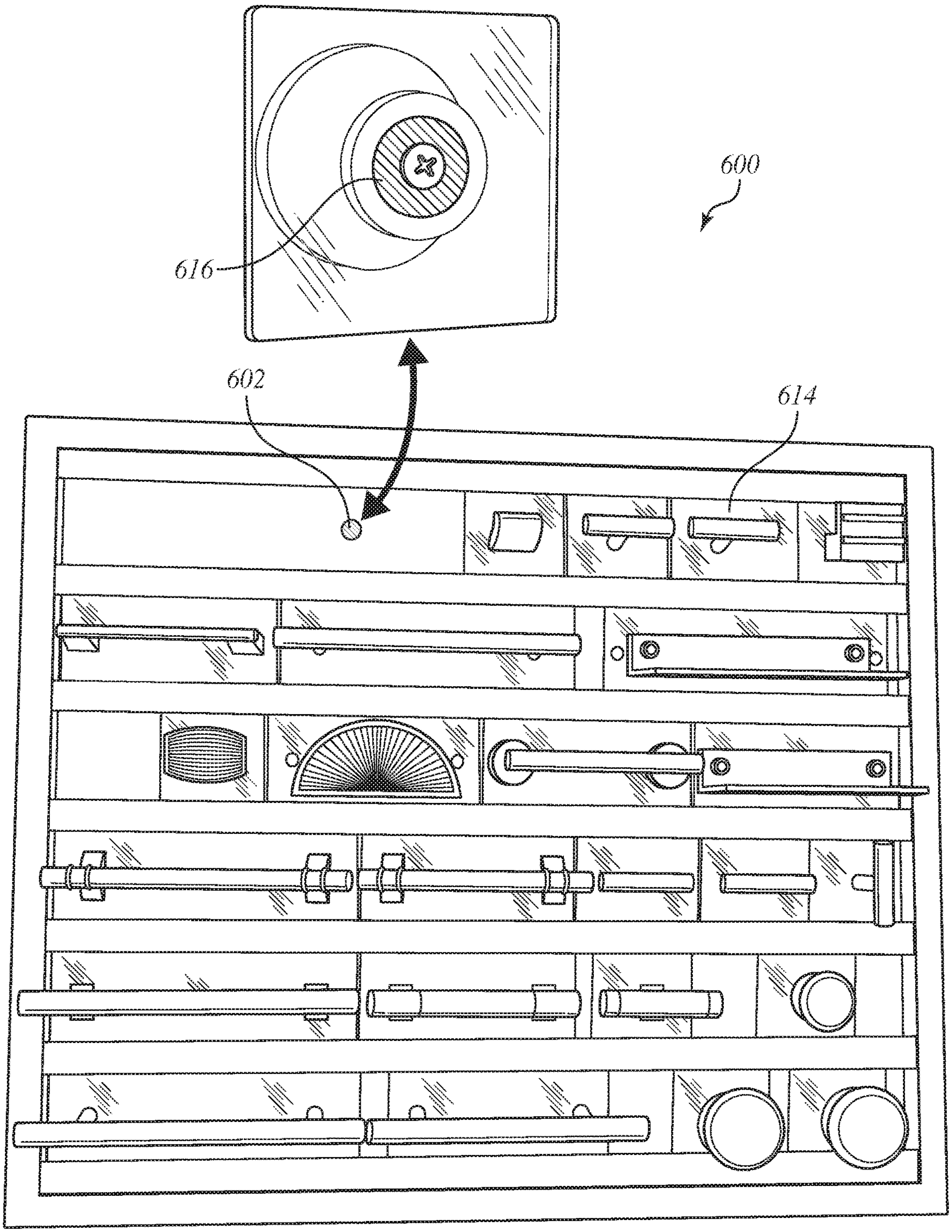
FIG. 24 shows a view of the modular merchandising display according to alternative embodiments.

In other embodiments shown in FIG. 24, a modular merchandising display 600 includes a reset map and corresponding color dots 602 (or other corresponding or matching features or insignia) to aid in setting up the modular merchandising display 600. The modular merchandising displays 600 may be sized to make it feasible to maintain ability to transport. Thus, multiple modular merchandising displays 600 in which to merchandise additional product may be used. Due to the dimensions of the display system and product attached to appropriately sized product bases 614, resetting each modular display may require additional tools. One tool is a color-dot system. On the front of the display, a color code may be notated on the front modular display. On the back side of each of the rectangular product base 614, associated color dots 616 may also be attached to assist in a more efficient display reset. Additionally, each modular merchandising display 600 may also be equipped with a loose reset map (not shown) to help the user reset each of the products back into the board channels.

Features of embodiments of the invention include:

1. A merchandising display that allows for the easy removal of the product to visualize the product, for example, products mounted on removable transparent bases.
2. The use of channels or rails allowing for the easy insertion, removal and interchangeability of the displayed products, information or different backgrounds using, for example, a "tilt and drop" action.
3. A modular merchandising display composed of interlocking pieces allowing flexibility in height, while the extrudable material allowing flexibility in width.

Although the present invention has been described in detail for the purpose of illustration, it is to be understood that such detail is solely for that purpose and that variations can be made therein by those in the art without departing from the spirit and scope of the invention.

What is claimed is:

1. A display system comprising:

a plurality of interlocking slat wall pieces vertically interlocked together, wherein each slat wall piece comprises at least one display channel on a first side of the slat wall piece, wherein, the plurality of interlocking slat wall pieces are configured such that when interlocked together, each of the at least one display channels are located only on one side of the display system, and wherein each slat wall piece comprises:

an upper locking groove disposed at a top side of each slat wall piece comprising an upper horizontal element; and a lower locking lip disposed at a bottom side of each slat wall piece comprising an upper horizontal face corresponding to the upper horizontal element of the upper locking groove; and wherein the lower locking lip of an upper slat wall piece is configured to be received in the upper locking groove of a lower slat wall piece such that the upper slat wall piece and the lower slat wall piece are interlocked together;

a plurality of display pieces each having a base configured to display a display item attached thereto; and wherein each display piece is configured to be removably received in the at least one display channel for providing interchangeability of the display pieces; and wherein a top portion of each display piece is configured to be received first in an upper groove of the at least one display channel, and wherein each display piece is further configured to be tilted such that it clears a top edge of a lower groove of the at least one display channel, and a lower portion thereof is configured to be dropped in the lower groove after tilting, and wherein the upper groove and the lower groove are configured to cooperate with each display piece to allow each display piece to be tilted and dropped.

2. The display system of claim 1, wherein each display piece includes at least one through hole, wherein each at least one through hole is configured for receiving a fastener configured to fasten the display item to the at least one display piece.

3. The display system of claim 2, wherein the at least one through hole has a counter sink configured for receiving a fastener head of the fastener.

4. The display system of claim 1, wherein each base is formed from a transparent material.

5. The display system of claim 1, wherein a pair of bases are configured to display one of the display items in one of a horizontal orientation and a vertical orientation.

6. The display system of claim 1, wherein the display item is a household hardware product selected from a hook, a bath accessory, a hinge, a knob and a pull.

7. The display system of claim 1, further comprising at least one visualizer clip configured to be removably received in the at least one display channel, and also configured to clip onto a cabinet door or cabinet door sample when removed from the at least one display channel to hold one of the display pieces on the cabinet door or cabinet door sample.

8. The display system of claim 7, the at least one visualizer clip further comprising a pair of visualizer clips configured to clip to a cabinet door or cabinet door sample and hold a display piece there between in one of a horizontal orientation and a vertical orientation.

9. The display system of claim 7, wherein the at least one visualizer clip has a leg having spring back flexibility and is configured to be clipped on a cabinet door or cabinet door sample of varying thicknesses.

10. The display system of claim 8, wherein the at least one visualizer clip comprises a feature corresponding to a matching feature on the at least one display channel.

11. The display system of claim 1, wherein the lower locking lip of the lower slat wall piece is configured to be inserted into an end cap.

12. The display system of claim 1, further comprising at least one frame piece comprises a backing board attached to a rear side of the plurality of slat wall pieces.

13. The display system of claim 12, further comprising at least one through hole disposed in the backing board configured for at least one of mounting and holding.

14. A display system comprising:

a plurality of interlocking slat wall pieces comprising a lower slat wall piece and an upper slat wall piece, wherein the plurality of interlocking slat wall pieces are vertically interlocked together, wherein each slat wall piece of the plurality of interlocking slat wall pieces comprises:

a top end; and a bottom end;

wherein the top end of the lower slat wall piece is configured to receive the bottom end of the upper slat wall piece and wherein the top end of the lower slat wall piece is configured to retain the bottom end of the upper slat wall in at least two dimensions;

wherein, when the bottom end of the upper slat wall piece is received by the top end of the bottom slat wall piece, the slat wall pieces comprise an interlocked connection and are configured substantially coplanar with a vertical axis; and at least one display channel on a first side of the slat wall piece, each display channel comprising a channel height and a depth; wherein each display channel comprises an upper groove comprising a bottom edge and a first height, and a lower groove comprising a top edge and a second height;

a plurality of display pieces each having a base configured to display a display item attached thereto, the base comprising a height less than a combination of the channel height and the first height, and more than a combination of the channel height and the second height;

wherein each display piece is configured to be removably received in the at least one display channel, wherein a top portion of each display piece is configured to be received first in the upper groove, and wherein the display piece is further configured to be tilted such that it clears the top edge of the lower groove, and a lower portion thereof is configured to be dropped in the lower groove after tilting, and wherein the upper groove and the lower groove are configured to cooperate with the display piece to allow the display piece to be tilted and dropped.

15. The display system of claim 14, wherein the display item is a household hardware product selected from a hook, a bath accessory, a hinge, a knob and a pull.

16. The display system of claim 14, further comprising at least one visualizer clip configured to be removably received in the at least one display channel, and also configured to clip onto a cabinet door or cabinet door sample when removed from the at least one display channel to hold one of the display pieces on the cabinet door or cabinet door sample.

17. The display system of claim 16, the at least one visualizer clip further comprising a pair of visualizer clips configured to clip to a cabinet door or cabinet door sample and hold a display piece there between in one of a horizontal orientation and a vertical orientation.

18. The display system of claim 16, wherein the at least one visualizer clip has a leg having spring back flexibility and is configured to be clipped on a cabinet door or cabinet door sample of varying thicknesses.

19. The display system of claim 16, wherein the at least one visualizer clip comprises a first feature configured to be received in the upper groove, wherein the at least one visualizer clip is further configured to be tilted and a second feature thereof is configured to be received in the lower groove.

20. The display system of claim 1, the plurality of interlocking slat wall pieces further comprising a vertical wall portion, the vertical wall portion further comprising a first upper protrusion comprising a first upper groove on a lower portion of the first upper protrusion, and a second upper groove on an upper portion of the first upper protrusion, the second upper groove configured to receive the lower locking lip of a vertically adjacent interlocking slat wall piece.

21. The display system of claim 20, the at least one display channel is a first display channel, and the plurality of interlocking slat wall pieces further comprising a second display channel on a first side of the slat wall piece below the first display channel.

22. The display system of claim 21, the second display channel further comprising an intermediate protrusion comprising a third upper groove on a lower portion of the intermediate protrusion, and a lower groove of the first display channel formed in an upper portion of the intermediate protrusion, wherein a vertically adjacent interlocking slat wall piece comprises a lower groove of the second display channel.

23. The display system of claim 14, wherein the base of the display pieces comprises a top edge and a bottom edge, the top edge being configured to be inserted into the upper groove of the at least one display channel and the bottom edge being configured to be rotated inward and then dropped into the lower groove.

24. The display system of claim 14, the plurality of interlocking slat wall pieces further comprising a vertical wall portion, the vertical wall portion further comprising:

a lower portion including a locking lip;

a first upper protrusion comprising a first upper groove on a lower portion of the first upper protrusion, and a second upper groove on an upper portion of the first upper protrusion, the second upper groove configured to receive the locking lip of a vertically adjacent interlocking slat wall piece.

25. The display system of claim 24, the at least one display channel is a first display channel, the plurality of interlocking slat wall pieces further comprising a second display channel on a first side of the slat wall piece, wherein the plurality of interlocking slat wall pieces are configured such that when interlocked together, each of the at least one display channels are located only on one side of the display system.

26. The display system of claim 25, the second display channel further comprising an intermediate protrusion comprising a third upper groove on a lower portion of the intermediate protrusion, and the lower groove of the first display channel formed in an upper portion of the intermediate protrusion, wherein a vertically adjacent interlocking slat wall piece comprises the lower groove of the second display channel.

* * * * *